(12) United States Patent
Arai et al.

(10) Patent No.: US 7,850,889 B2
(45) Date of Patent: Dec. 14, 2010

(54) METHOD FOR MANUFACTURING LASER BEAM TRANSMITTING MEMBER CAPABLE OF PREVENTING POOR LASER WELDING, RESIN MOLDING APPARATUS AND METHOD FOR MANUFACTURING COMPOSITE RESIN PRODUCT

(75) Inventors: Tsuyoshi Arai, Kariya (JP); Yasunori Kawamoto, Toyota (JP); Hideki Okuda, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1287 days.

(21) Appl. No.: 10/865,967

(22) Filed: Jun. 14, 2004

(65) Prior Publication Data

US 2004/0261940 A1 Dec. 30, 2004

(30) Foreign Application Priority Data

Jun. 24, 2003 (JP) ............................. 2003-180203

(51) Int. Cl.
*B29C 65/00* (2006.01)
*H05B 6/00* (2006.01)
*B29B 7/00* (2006.01)
*B29C 35/00* (2006.01)
*B32B 3/00* (2006.01)

(52) U.S. Cl. .................. 264/248; 264/328.12; 264/478; 264/482; 156/272.8; 428/57; 428/542; 425/565; 425/566

(58) Field of Classification Search .................. 264/248, 264/482, 328.12, 478; 425/565, 566; 428/57, 428/542; 156/272.8
See application file for complete search history.

(56) References Cited

U.S. PATENT DOCUMENTS

| 5,744,087 A | * | 4/1998 | Williams et al. | ......... 264/297.2 |
| 2004/0239007 A1 | * | 12/2004 | Arai et al. | .................... 264/482 |

FOREIGN PATENT DOCUMENTS

| JP | 2002-71274 | 3/2000 |
| JP | 2001-71384 | 3/2001 |
| JP | 2002-67165 | 3/2002 |
| JP | 2002-120293 | 4/2002 |
| JP | 2003-156968 | * 6/2003 |

OTHER PUBLICATIONS

Machine Translation of JP 2002-067165, Nakamura, Mar. 5, 2002.*
Machine Translation of JP 2000-071274, Watanabe et al., Mar. 7, 2000.*
JP Office Action issued Jul. 31, 2006 (and English translation).

* cited by examiner

*Primary Examiner*—Monica A Huson
*Assistant Examiner*—Michael T Piery
(74) *Attorney, Agent, or Firm*—Nixon & Vanderhye PC

(57) ABSTRACT

A metal mold is prepared, which has a gate, a cavity in which a virtual curve is formed, which forms at least a welding target part of a laser beam transmitting member along the virtual curve, and in which a filling terminal wall is formed along a curve parallel to the virtual curve, and a throttle part for reducing the flow of a resin flowing from the gate toward the cavity, which is connected to the cavity, and whose connection boundary is formed along a curve parallel to the virtual curve. Then, a resin is injected into the gate and a crystalline laser beam transmitting member is molded out of the injected resin using the metal mold.

2 Claims, 19 Drawing Sheets

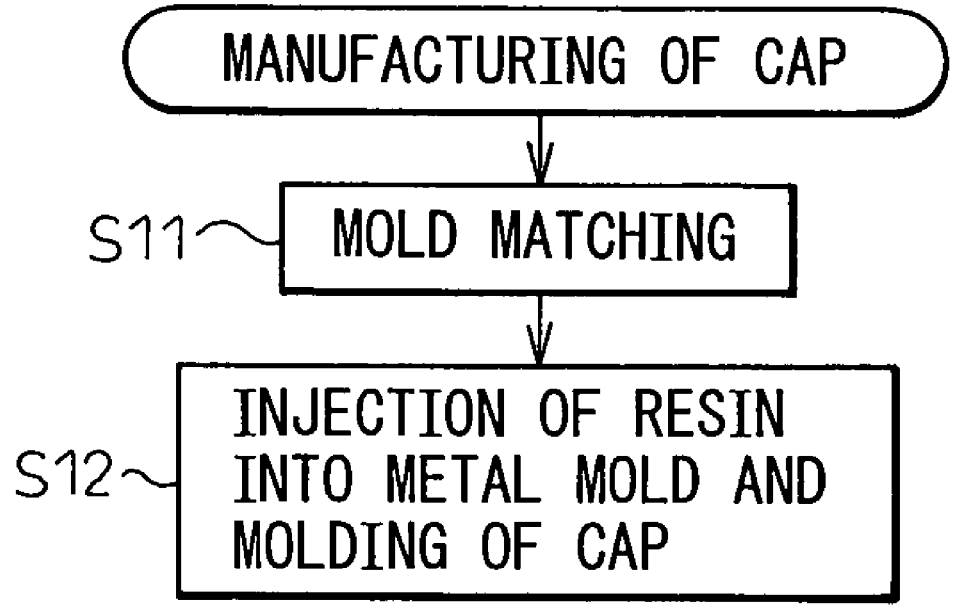

METHOD FOR MANUFACTURING LASER BEAM TRANSMITTING MEMBER CAPABLE OF PREVENTING POOR LASER WELDING, RESIN MOLDING APPARATUS AND METHOD FOR MANUFACTURING COMPOSITE RESIN PRODUCT

BACKGROUND OF THE INVENTION

1. Field of the Invention

The present invention relates to a method for manufacturing a laser beam transmitting member, a resin molding apparatus and a method for manufacturing a composite resin product.

2. Description of Related Art

Conventionally, a method for manufacturing a composite resin product by molding resins into a laser beam transmitting member and a laser beam absorbing member and welding the two members with a laser beam has been proposed (JP 2001-71384, for example).

When a laser beam transmitting member is a cap that covers a hole in a laser beam absorbing member or the like, a method, for example, shown in FIG. 19A or FIG. 20A is adopted. According to such a method, a welding target part $1a$ along an annular virtual curve L of a laser beam transmitting member 1 is irradiated with laser beams and the laser beams that have been transmitted through the welding target part $1a$ are absorbed by a laser beam absorbing member 2. The part of the laser beam absorbing member 2 that has absorbed the laser beams melts and the heat of the molten resin melts the part $1a$ of the laser beam transmitting member 1, and thus the two members 1 and 2 are welded to each other.

A metal mold 4 for molding a resin into the laser beam transmitting member 1, to be welded with a laser beam as shown in FIG. 19A, is shown in FIG. 19B. In a cavity 6 of the metal mold 4, a route distance $X_1$ between a part (a welding target molding part) $6a$ for molding the welding target part $1a$ and a filling terminal wall $6b$ is constant. In the metal mold 4, on the other hand, a route distance $X_2$ between each part of the welding target molding part $6a$ and a gate 5 nearest to the part is not constant. Therefore, the time intervals taken for completely filling a resin into the respective peripheral ends of the welding target molding part $6a$ differs from part to part. When a crystalline laser beam transmitting member 1 is molded, the shorter the distance $X_2$, that is, the nearer the welding target molding part $6a$ is to the gate 5, the higher the inclusion rate of crystal (which is the proportion of the volume of the crystal included in a product with respect to the total volume of the product) at the welding target part $1a$ to be molded, and the transmittance of laser beam becomes lower, accordingly. As a result, when the crystalline laser beam transmitting member 1 molded using the metal mold 4 is welded to the laser beam absorbing member 2, the following problem arises. If, for example, the irradiation energy of a laser beam is determined in accordance with the welding target part $1a$ molded at a part $6a$ near to the gate 5, the transmitted laser beam at the welding target part $1a$ molded at another part $6a$ far from the gate 5 applies excessively large energy to the laser beam absorbing member 2. When the given energy is excessively large, the molded resin of the laser beam absorbing member 2 is gasified and voids are created at the welding boundary surface, resulting in reduction in the welding strength. Moreover, when the given energy is excessively large, the laser beam absorbing member 2 melts excessively and burrs are produced, resulting in deterioration in the appearance of a compound resin product. On the other hand, if the irradiation energy is determined in accordance with the welding target part $1a$ molded at a part $6a$ far from the gate 5, the transmitted laser beam at the welding target part $1a$ molded at the part $6a$ near the gate 5 cannot apply sufficient energy to the laser beam absorbing member 2. When the given energy is insufficient, the amount of molten laser beam absorbing member 2 is insufficient, resulting in a reduction in the welding strength.

Next, a metal mold 7 for molding a resin into the laser beam transmitting member 1 to be welded with a laser beam as shown in FIG. 20A is shown in FIG. 20B. In a cavity 9 of the metal mold 7, a route distance $Y_1$ between each part of a part (a welding target molding part) $9a$ for molding the welding target part $1a$ and a gate 8 nearest to the part is almost constant. In the cavity 9 of the metal mold 7, however, a route distance $Y_2$ between the welding target molding part $9a$ and a filling terminal wall $9b$ is not constant. Therefore, the time intervals taken for completely filling a resin into the respective peripheral ends of the welding target molding part $9a$ differs from part to part. When the crystalline laser beam transmitting member 1 is molded, the greater the distance $Y_2$, that is, the farther the filling terminal wall $9b$ is from the welding target molding part $9a$, the higher the inclusion rate of crystal at the welding target part $1a$ to be molded, and the transmittance of the laser beam becomes lower accordingly. As a result, also when the crystalline laser beam transmitting member 1 molded using the metal mold 7 is welded to the laser beam absorbing member 2, poor welding is likely to occur as in the case of the crystalline laser beam transmitting member 1 molded using the metal mold 4.

SUMMARY

The above-mentioned problems being taken into account, the object of the present invention is to provide a method for manufacturing a laser beam transmitting member capable of reducing poor welding in laser welding and a resin molding apparatus suitable to carry out the method.

Another object of the present invention is to provide a method for manufacturing a composite resin product capable of reducing poor welding.

In first and second aspects of the present invention, a metal mold having gates, a cavity for molding at least a welding target part of a laser beam transmitting member and a throttle part for reducing the flow of resin flowing from the gate toward the cavity is prepared. In this metal mold, a filling terminal wall of the cavity is formed along a first curve parallel to a virtual curve. Due to this, it is possible to make almost constant a route distance between a part for molding the welding target part along the virtual curve and the filling terminal wall, in the cavity. Moreover, in this metal mold, the throttle part is connected to the cavity and the connection boundary thereof is formed along a second curve parallel to the virtual curve. Due to this, it is possible to make almost constant, in the cavity, a route distance between the part for molding the welding target part along the virtual curve and the connection boundary.

In the first and second aspects of the present invention, a resin is injected into the gates of the metal mold and a crystalline laser beam transmitting member or a blank is molded out of the injected resin using the metal mold. When a route distance between the throttle part and the gate is not constant, there arises a difference in the time taken for the resin injected into the gates to reach each part of the throttle part. However, the resin that has reached the throttle part nearer to the gate than the farthest throttle part (the farthest part) from the gate is made to flow toward the farthest part, at which the flow resistance is low, more easily than the resin flow toward the cavity where the flow resistance is high because of the presence of the throttle part. Due to this, the flow rate of resin that crosses the connection boundary from the gate side toward the cavity side increases rapidly when the resin reaches the farthest part.

According to the present invention, in which the resin crosses the connection boundary all at once and the route distance between each connection boundary and the part for molding the welding target part (the welding target molding part) and the route distance between each filling terminal wall and the part for molding the welding target part (the welding target molding part) are almost constant, the difference in the time at which the resin reaches each filling terminal wall is reduced and moreover, the difference in the time at which the filling of the resin is completed at each part of the welding target molding part is reduced. Therefore, it is possible to mold a welding target part uniform not only in the inclusion rate of crystal, and also in the transmittance of a laser beam, regardless of the difference in the route distance between the gate and the welding target molding part. When the welding target part is welded with a laser beam to a laser beam absorbing member, poor welding can be prevented because the difference is small in the amount of energy to be given to the laser beam absorbing member by the laser beam that has been transmitted through each part of the welding target part.

In the present invention, the "curve" means a general curve, including a straight line. Moreover, the number of the "gates" can be one or more in the present invention.

According to a third aspect of the present invention, a blank having an outline curve that coincides with a first curve parallel to a virtual curve is molded out of a resin using a metal mold. Then, a laser beam transmitting member and an excess material part are separated from each other by cutting the blank along a cutting curve that does not coincide with any curve parallel to the virtual curve. By adopting this method, it is possible to make uniform the transmittance of laser beam at any point of a welding target part even when the outline curve of the laser beam transmitting member, which coincides with the cutting curve, does not coincide with any curve parallel to the virtual curve.

A fourth aspect of the present invention is a laser beam transmitting member manufactured by the method of any one of the first to third aspects. When a welding target part of the laser beam transmitting member is welded with a laser beam to a laser beam absorbing member, poor welding can be prevented because the difference is small in the amount of energy to be given to the laser beam absorbing member by the laser beam that has been transmitted through each part of the welding target part.

A fifth aspect of the present invention is a resin molding apparatus comprising a metal mold having the same configuration as that used in any one of methods in the first to third aspects and, therefore, the resin molding apparatus in the present aspect is preferably used when the method in the first, second or third aspect is carried out and can realize the same effect as that described above.

According to a sixth aspect of the present invention, a welding target part of a laser beam transmitting member manufactured by the method of any one of the first to third aspects is welded with a laser beam to a laser beam absorbing member. Therefore, the difference is small in the amount of energy to be given to the laser beam absorbing member by the laser beam that has been transmitted through each part of the welding target part. Due to this, poor welding can be prevented and a composite resin product excellent in the welding strength and appearance can be manufactured. As for the step for manufacturing a laser beam transmitting member and the step for manufacturing a laser beam absorbing member, the order thereof may be changed or the two steps may be carried out simultaneously.

A seventh aspect of the present invention is a composite resin product manufactured by the method according to the sixth aspect and, therefore, the composite resin product in the present aspect is excellent in the welding strength and appearance.

The present invention may be more fully understood from the description of the preferred embodiments of the invention set forth below, together with the accompanying drawings.

BRIEF DESCRIPTION OF THE DRAWINGS

In the drawings:

FIG. 9 is a flow chart for explaining a method for manufacturing a cap in the manufacturing of the electromagnetic valve according to the first embodiment.

DESCRIPTION OF THE PREFERRED EMBODIMENTS

A plurality of embodiments of the present invention are described below with reference to the drawings.

First Embodiment

Figure 2:
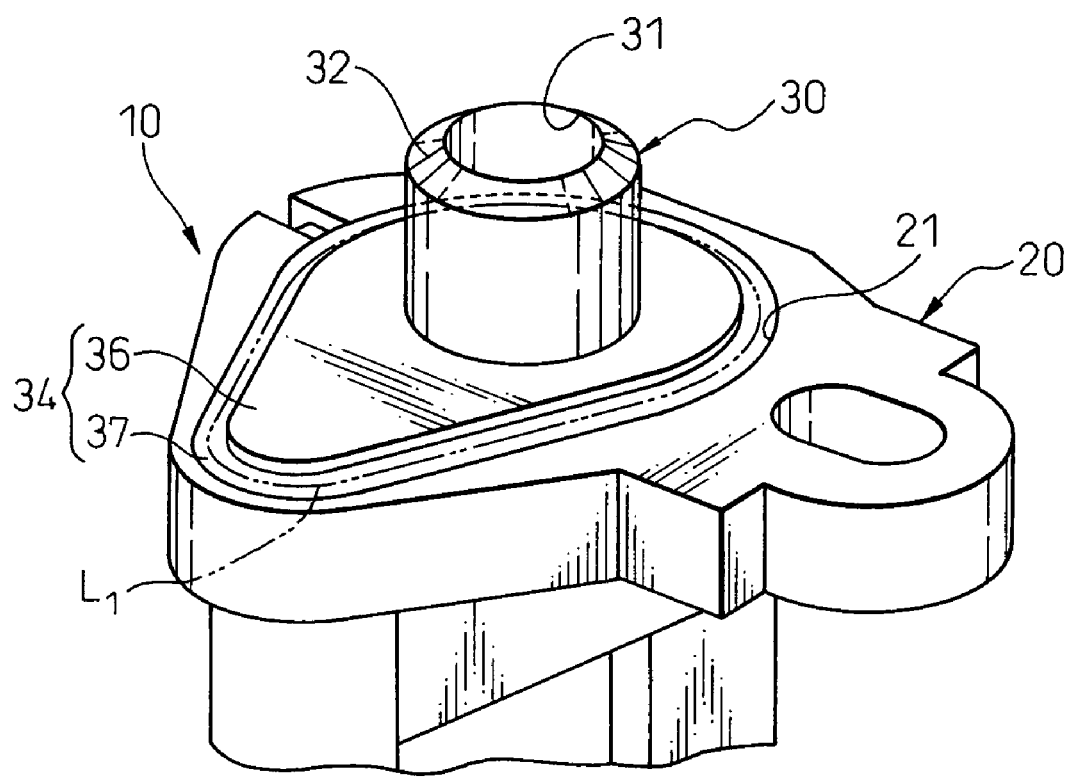
FIG. 2 is a perspective view showing the electromagnetic valve according to the first embodiment.
Figure 3A:
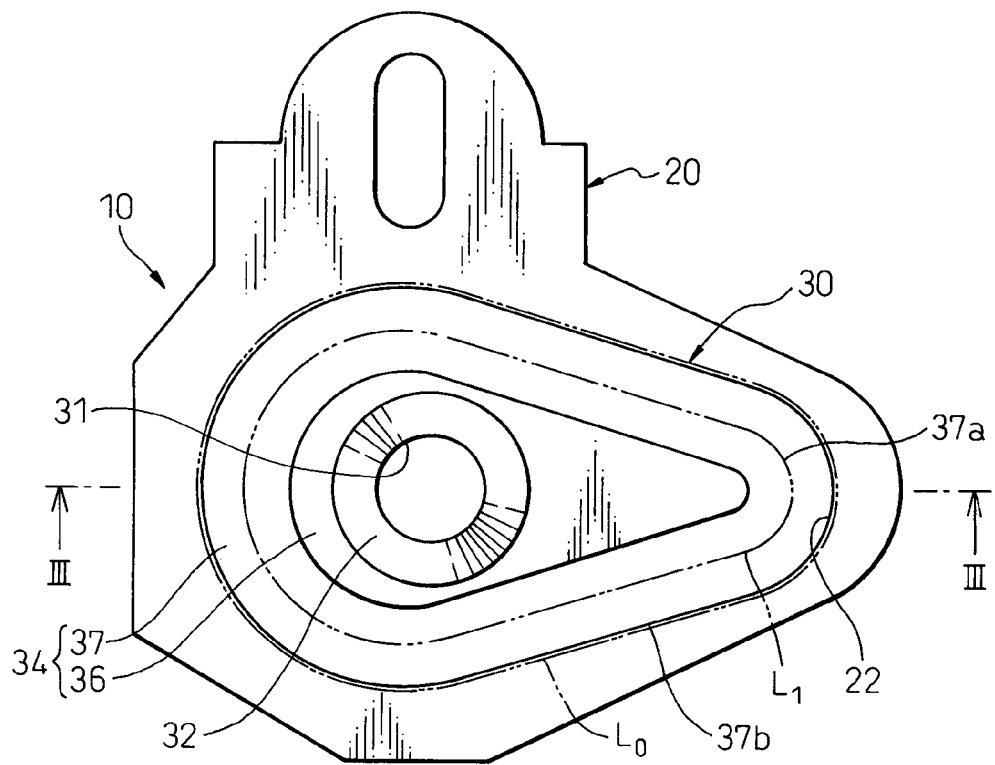
FIG. 3A is a sectional view showing the electromagnetic valve according to the first embodiment.

An electromagnetic valve manufactured as a composite resin product according to a first embodiment of the present invention is shown in FIG. 2 and FIG. 3. An electromagnetic valve 10 reciprocates a valve member accommodated in an inner hole 21 of a housing 20 by energizing a coil buried in the housing 20. By reciprocating the valve member, the electromagnetic valve 10 controls the flow of a fluid by opening and closing a fluid passage formed by the inner hole 21 of the housing 20 and an inner hole 31 of a cap 30.

First, the configuration of the electromagnetic valve 10 is explained.

In the housing 20, the inner hole 21 has an insertion hole part 22 having a stepped hole at its opening end. A step wall 24 of the insertion hole part 22 is formed annularly and has a flat wall surface. The cap 30 has a cylindrical main body part 32 that forms the inner hole 31 and an annular flange-shaped insertion plate part 34 provided at one end of the main body part 32. The insertion plate part 34 comprises an inner circumferential part 36 having a constant thickness $T_1$ and an outer circumferential part 37 having a constant thickness $T_2$, which is thinner than the inner circumferential part 36. The plate surfaces of the parts 36 and 37 which form an end surface of the cap 30 are connected to each other so as to form a plane, which is a flat surface perpendicular to the center axis of the main body part 32. The outer circumferential part 37 of the insertion plate part 34 is inserted into the insertion hole part 22 and a part 37a along a virtual curve $L_1$ is welded to the step wall 24. The virtual curve $L_1$ in the present embodiment coincides with a curve parallel to an outline curve $L_0$ along which an outermost circumferential wall 37b of the outer circumferential part 37 runs and is an annular curve whose curvature changes in the circumferential direction.

Figure 4:
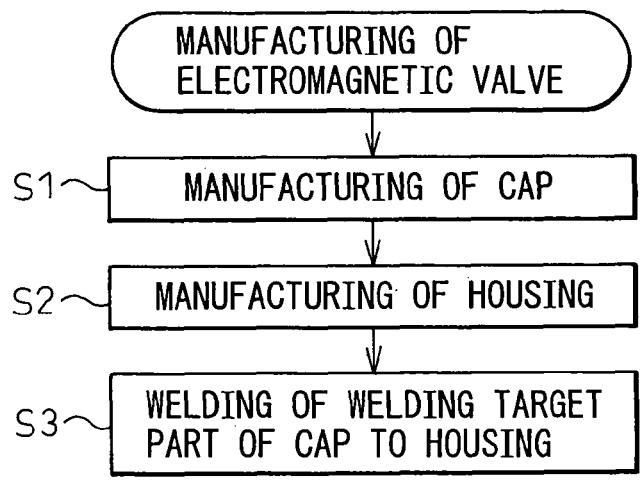
FIG. 4 is a flow chart for explaining a method for manufacturing the electromagnetic valve according to the first embodiment.

Next, a method for manufacturing the electromagnetic valve 10 is explained according to the flow chart shown in FIG. 4.

In step S1, the cap 30 having the ability to transmit laser beams and having a crystalline structure is manufactured. In the present embodiment, the cap 30 is molded out of a resin using a resin molding apparatus 100 shown in FIG. 1. The cap 30 is molded out of a thermoplastic resin so that the absorption ability of the irradiated laser beam thereof is small, which will be described later, or preferably, the transmittance of laser beam is 25% or higher. As a thermoplastic resin, a resin such as polyamide, polypropylene, polybutylene terephthalate, or the above-mentioned resin to which a clarifying agent, which improves the transparency, or various kinds of additives, whose absorption ability of the laser beam to be used is sufficiently small, have been added, may be selected. The cap 30 described above corresponds to the "crystalline laser beam transmitting member" set forth in the claims and step S1 corresponds to the "step for manufacturing a laser beam transmitting member" set forth in the claims.

In step S2, the housing 20 having the ability to absorb laser beams and into which a coil is inserted is manufactured by resin molding. The housing 20 is molded out of a thermoplastic resin so that the absorption ability of the irradiated laser beam thereof is higher than that of the cap 30, or preferably, the transmittance of laser beam is 5% or lower. As a thermoplastic resin, a resin such as polyamide, polypropylene, polybutylene terephthalate, or the above-mentioned resin to which a coloring agent, such as carbon black, or various kinds of additives have been added may be selected. The housing 20 described above corresponds to the "laser beam absorbing member" set forth in the claims and step S2 corresponds to the "step for manufacturing a laser beam absorbing member" set forth in the claims.

Figure 3B:
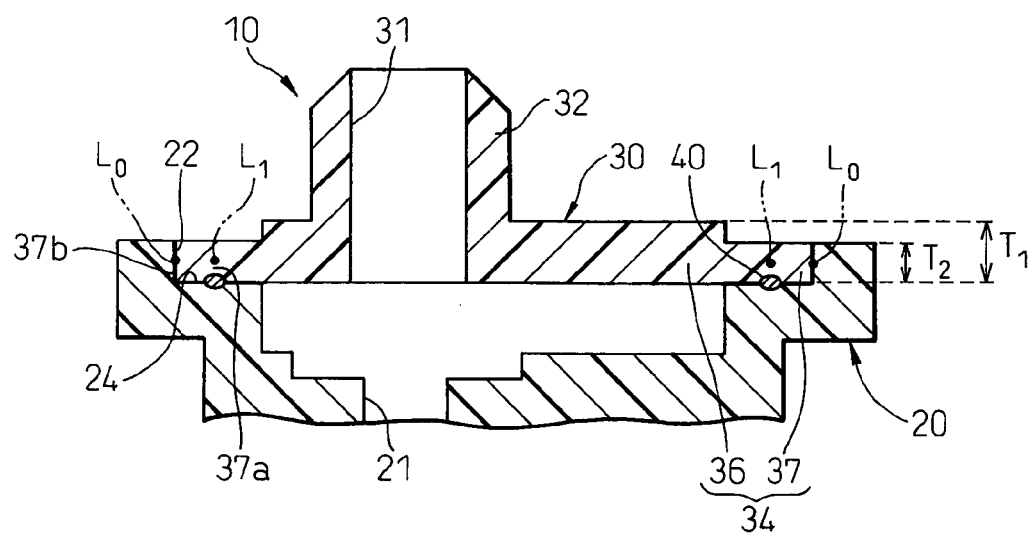
FIG. 3B is a sectional view along the III-III line in FIG. 3A.
Figure 5:
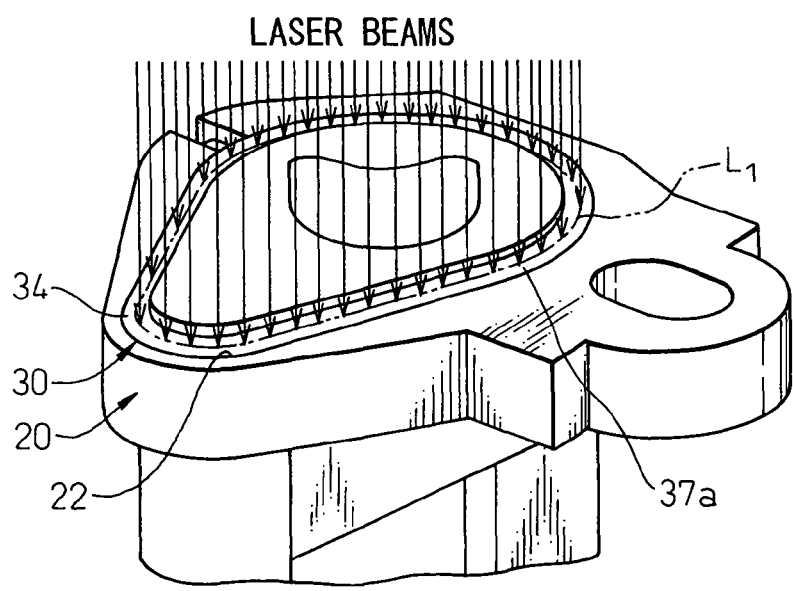
FIG. 5 is a perspective view showing a laser welding method in the manufacturing of the electromagnetic valve according to the first embodiment.

In step S3, after the insertion plate part 34 of the cap 30 is inserted into the insertion hole part 22 of the housing 20 in which a valve member is accommodated, the welding target part 37a of the insertion plate part 34 is welded with a laser beam to the step wall 24 of the insertion hole part 22. At this time, the entire area in the circumferential direction of the welding target part 37a along the virtual curve $L_1$ is irradiated with laser beams almost simultaneously as shown in FIG. 5, and the laser beams that have been transmitted through the part 37a are absorbed by the step wall 24. The step wall 24 that has absorbed the laser beams melts and the heat of the molten resin melts the welding target part 37a. The molten resins of the welding target part 37a and the step wall 24 are mixed, cooled and solidified. As a result, the cap 30 and the housing 20 are bonded to each other via a solidified mixed resin 40 as shown in FIG. 3B.

As a laser for generating laser beams in step S3, a solid state laser such as a glass laser, a ruby laser, a YAG laser and a titanium sapphire laser, or a gas laser such as an He—Ne laser, a $CO_2$ laser, a noble gas ion laser and an excimer laser, or a semiconductor laser may be selected. Before they are used, the output is adjusted so that the irradiation energy of laser beams that satisfies a desired value can be obtained. As described above, in order for the entire area in the circumferential direction of the welding target part 37a to be irradiated with laser beams almost simultaneously, for example, a method in which the laser beams emitted from a laser are dispersed by a prism and the direction of irradiation is adjusted by a mirror can be adopted. Step S3 described above corresponds to the "step for welding with a laser beam" set forth in the claims.

Next, the resin molding apparatus 100 used in step S1 described above is explained.

Figure 1A:
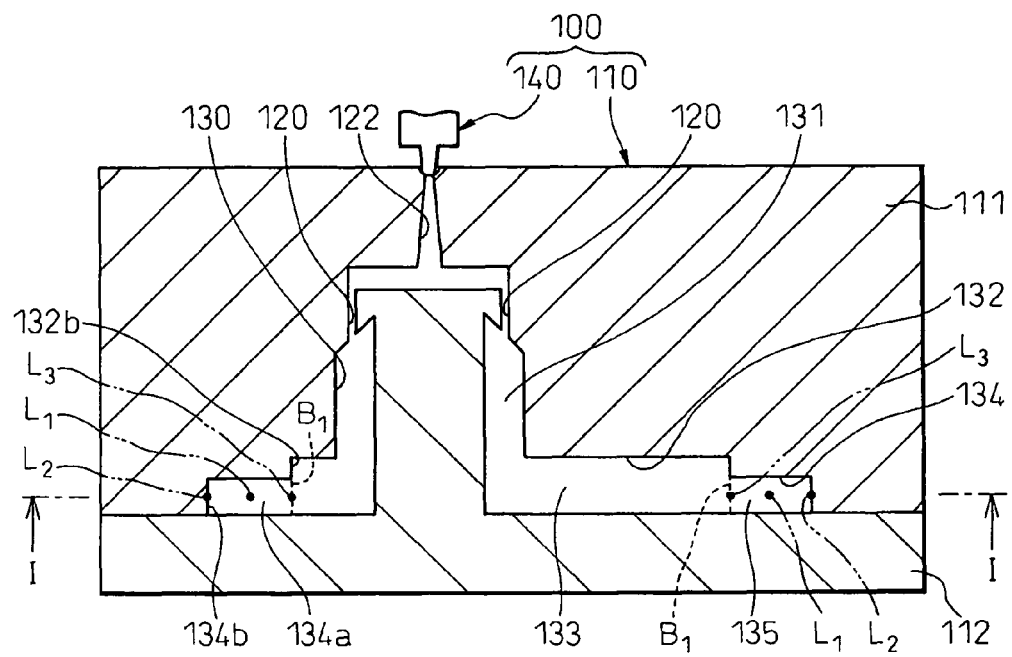
FIG. 1A is a sectional view showing a resin molding apparatus used for manufacturing an electromagnetic valve according to a first embodiment of the present invention.
Figure 1B:
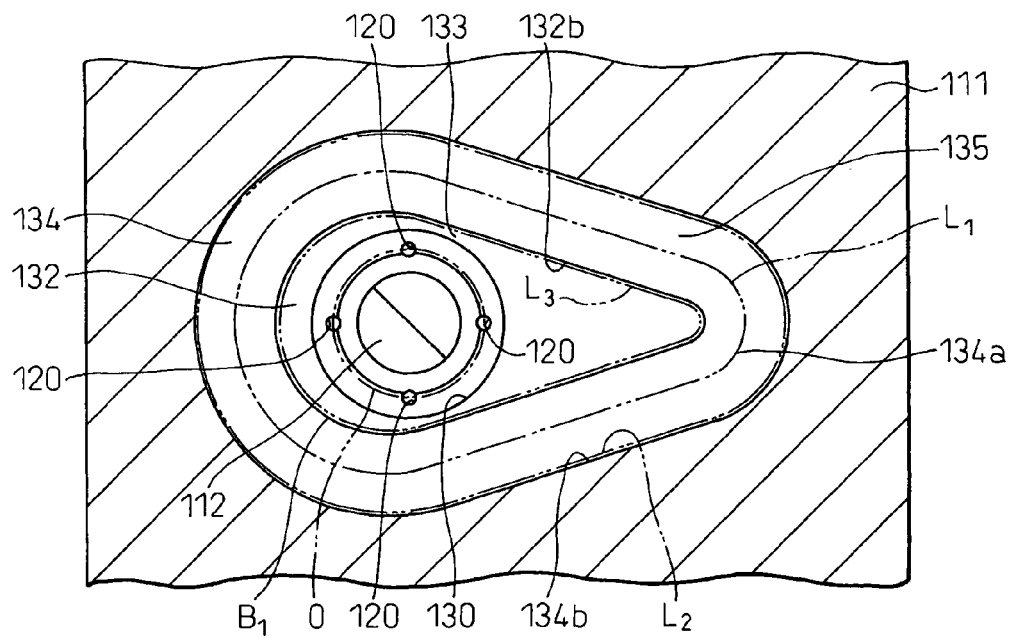
FIG. 1B is a sectional view along the I-I line in FIG. 1A.

As shown in FIGS. 1A and 1B, the resin molding apparatus 100 comprises a metal mold 110, an injector 140 for injecting a molten resin into the metal mold 110 and a mold opening/closing mechanism (not shown) for opening and closing the metal mold 110.

The metal mold 110 comprises a plurality of mold templates 111 and 112, and a plurality of gates 120, a first cavity 130, a second cavity 132 and a third cavity 134 are formed by matching the mold templates 111 and 112 (mold matching). The following explanation of the configuration of the metal mold 110 is given on the assumption that the mold matching in the metal mold 110 has been done.

The plurality of gates 120 are evenly spaced along a virtual circle O. The molten resin injected from the injector 140 is injected into the internal space of each gate 120 through a runner 122.

Figure 6:
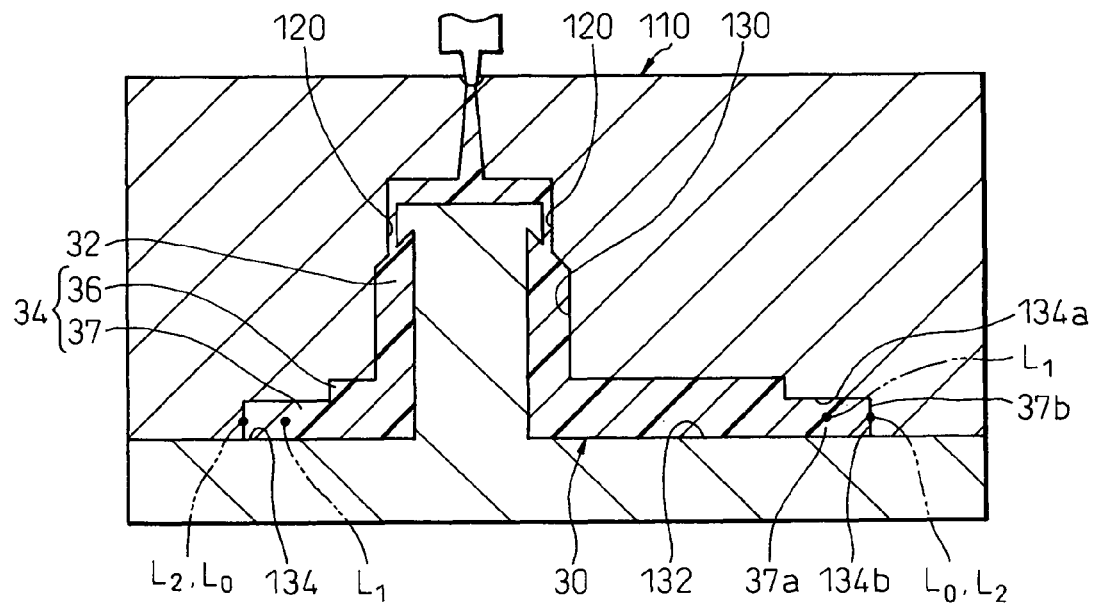
FIG. 6 is a diagram showing a method for molding a cap out of a resin in the manufacturing of the electromagnetic valve according to the first embodiment, and is a sectional view corresponding to FIG. 1A.

The first cavity 130 forms a cylindrical space 131 coaxial with the virtual circle O by the wall surface that has the outline shape of the main body part 32. One end of the first cavity 130 is connected to the plurality of gates 120 and the other end thereof is connected to the second cavity 132, respectively. When the second and third cavities 132 and 134 are not filled with a resin, the first cavity 130 passes the resin that has flowed into the space 131 from the gates 120 toward the second cavity 132. After the second and third cavities 132 and 134 are filled with the resin, the first cavity 130 is filled with the resin that has flowed from the gates 120 and thus the main body part 32 is molded as shown in FIG. 6.

The second cavity 132 forms a space 133, whose section is annular, by the wall surface that has the outline shape of the inner circumferential part 36 of the insertion plate part 34. The innermost circumferential end of the second cavity 132 is connected to the first cavity 130 and the outermost circumferential end to the third cavity 134, respectively. When the third cavity 134 is not filled with a resin, the second cavity 132 passes the resin, which has flowed into the space 133 from the first cavity 130, toward the third cavity 134. After the third cavity 134 is filled with the resin, the second cavity 132 is filled with the resin that has flowed from the first cavity 130 and thus the inner circumferential part 36 is molded as shown in FIG. 6.

The third cavity 134 forms a space 135 whose section is annular by the wall surface that has the outline shape of the outer circumferential part 37 of the insertion plate part 34. The innermost circumferential end of the third cavity 134 is connected to the second cavity 132. The third cavity 134 is filled with the resin that has flowed into the space 135 from the second cavity 132 and thus the outer circumferential part 37 including the welding target part 37a is molded as shown in FIG. 6. In the present embodiment, the metal mold 110 is configured so that an outermost circumferential wall 134b of the third cavity 134 molds the outermost circumferential wall 37b of the outer circumferential part 37 as shown in FIG. 6. The third cavity 134 described above corresponds to the "cavity" set forth in the claims.

Figure 7:
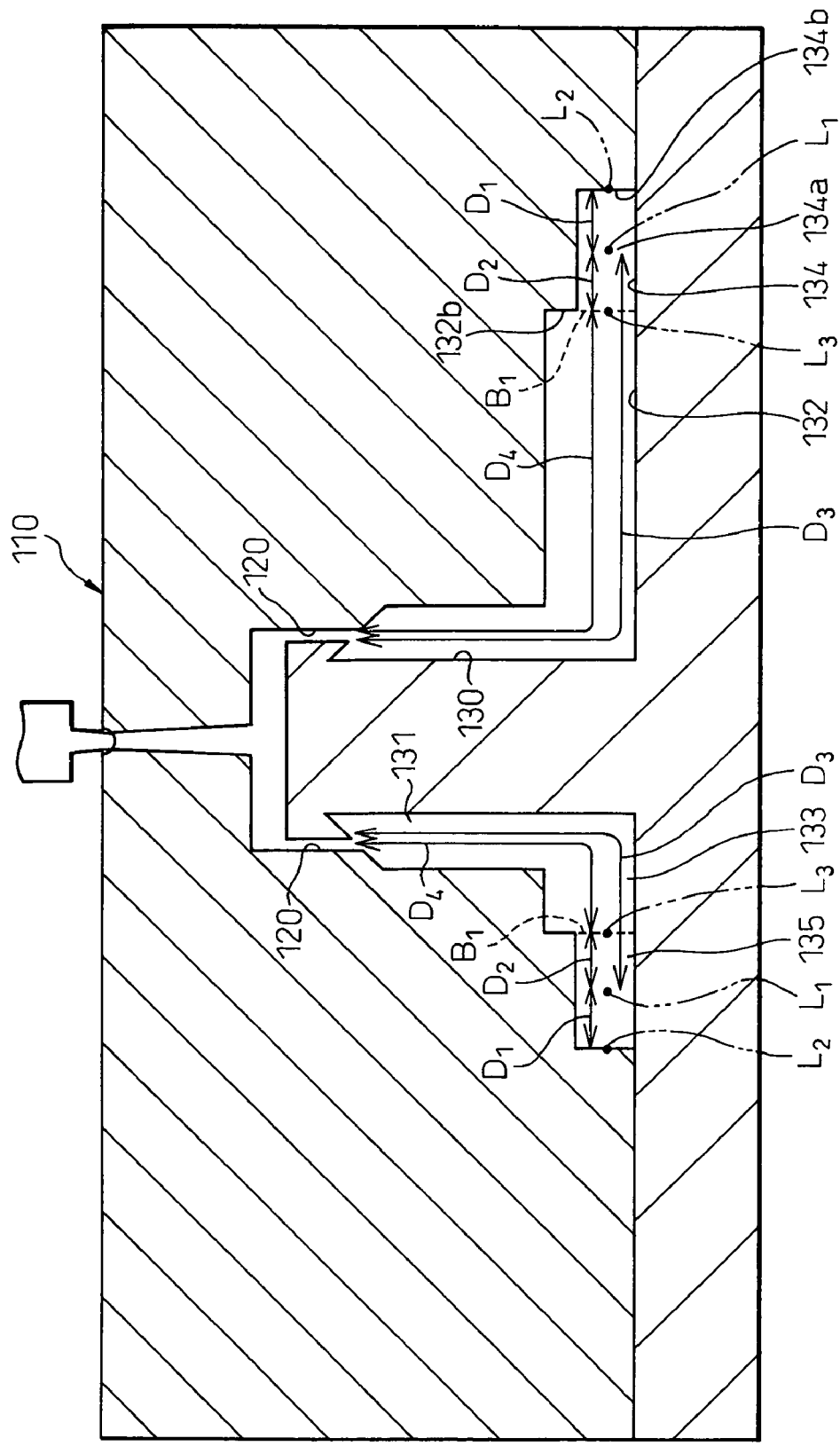
FIG. 7 is an enlarged view showing the resin molding apparatus used in the manufacturing of the electromagnetic valve according to the first embodiment, and is a sectional view corresponding to FIG. 1A.
Figure 8:
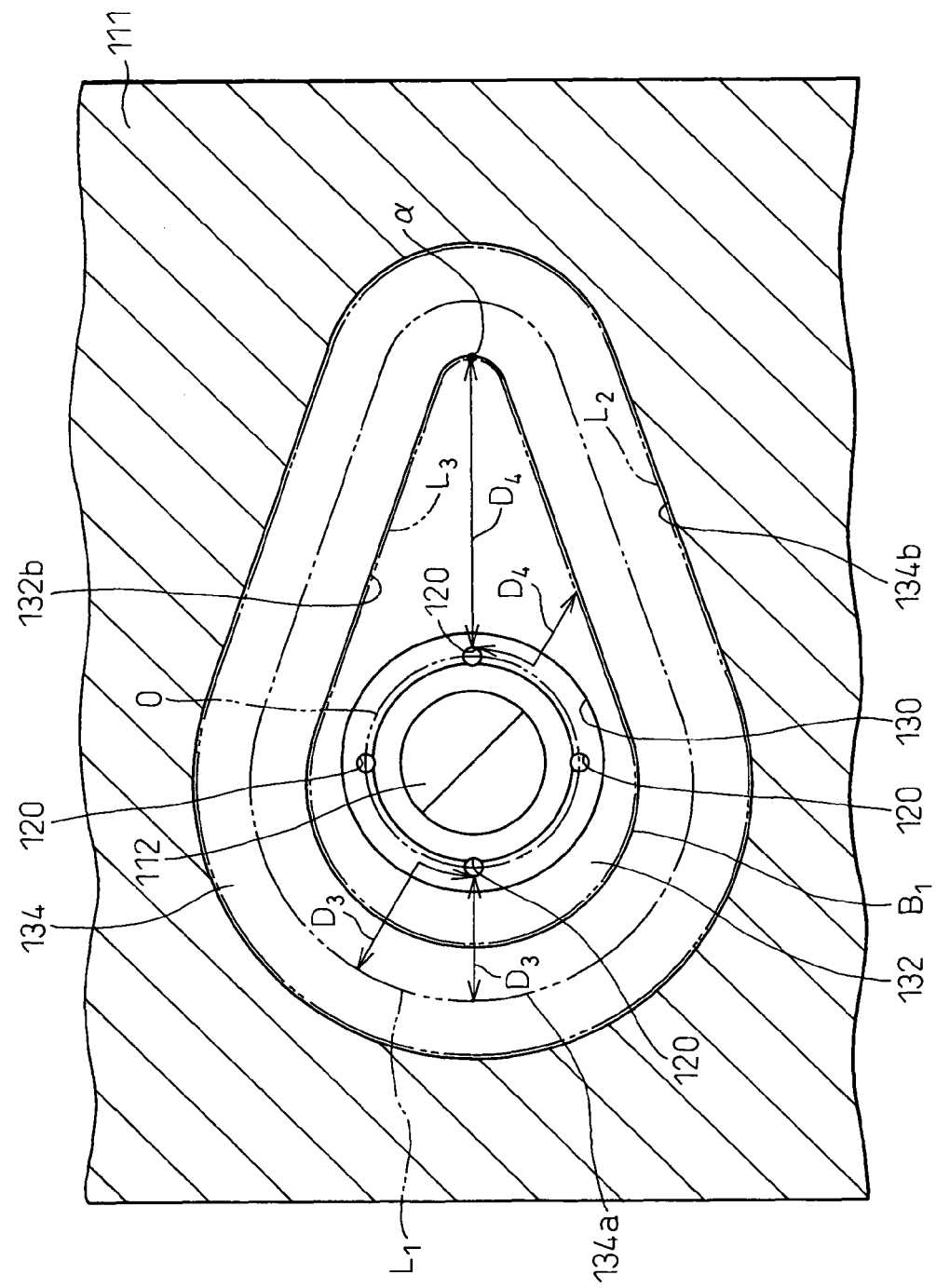
FIG. 8 is an enlarged view showing the resin molding apparatus used in the manufacturing of the electromagnetic valve according to the first embodiment, and is a sectional view corresponding to FIG. 1B.

As shown in FIGS. 1, 7 and 8, the virtual curve $L_1$ is formed at a part (a welding target molding part) 134a in the third cavity 134 that molds the welding target part 37a and the welding target part 37a to be obtained by the molding runs along the virtual curve $L_1$. In a state in which the virtual curve $L_1$ is formed, it follows that the outermost circumferential wall 134b of the third cavity 134 is formed at the downstream side of the virtual curve $L_1$ in the direction of the resin flow in the third cavity 134 and runs along a curve $L_2$ parallel to the virtual curve $L_1$. Therefore, a route distance $D_1$ between the welding target molding part 134a and the outermost circumferential wall 134b is almost constant, as shown in FIG. 7, and the outline curve $L_0$ of the outermost circumferential wall 37b to be molded by the outermost circumferential wall 134b of the third cavity 134 coincides with the parallel curve $L_2$, as shown in FIG. 6. The outermost circumferential wall 134b which is located at the filling terminal of the third cavity 134 and blocks the resin flow, corresponds to the "filling terminal wall" set forth in the claims.

Similarly, in a state in which the virtual curve $L_1$ is formed, it follows that an outermost circumferential wall 132b of the second cavity 132 is formed at the upstream side of the virtual curve $L_1$ in the direction of the resin flow in the third cavity 134 and runs along a curve $L_3$ parallel to the virtual curve $L_1$. Therefore, a route distance $D_2$ between the outermost circumferential wall 132b and the welding target molding part 134a is almost constant as shown in FIG. 7. A connection boundary $B_1$ between the outermost circumferential wall 132b that forms the outermost circumferential end of the second cavity 132 and the third cavity 134 coincides with a boundary between the space 133 of the second cavity 132 and the space 135 of the third cavity 134. When the sectional areas of the spaces 133 and 135, whose cross sections are annular, perpendicular to an axis extending in the radial direction are compared, the sectional area of the space 135 is smaller than that of the space 133 in the vicinity of the connection boundary $B_1$ because of the presence of the outermost circumferential wall 132b. Therefore, when the molten resin in the space 133 crosses the connection boundary $B_1$ and flows into the space 135, the sectional area in the resin flow is reduced by the outermost circumferential wall 132b. In other words, the outermost circumferential wall 132b corresponds to the "throttle part" set forth in the claims and the connection boundary $B_1$ corresponds to the "connection boundary" set forth in the claims.

Each of the gates 120 is arranged so that a route distance $D_3$ between each part of the welding target molding part 134a and its nearest gate 120 changes in the circumferential direction of the part 134a as shown, for example, in FIG. 7 and FIG. 8. Therefore, in the present embodiment in which the route distance $D_2$ between the welding target molding part 134a and the outermost circumferential wall 132b is almost constant, a route distance $D_4$ between each part of the outermost circumferential wall 132b and its nearest gate 120 changes in the circumferential direction of the wall 132b as shown, for example, in FIG. 7 and FIG. 8.

Next, the detail of the above-mentioned step S11 in which the cap 30 is molded out of a resin using the resin molding apparatus 100 is explained according to the flow chart shown in FIG. 9.

In step S11, the mold matching of the mold templates 111 and 112 of the metal mold 110 is done by the closing operation of the mold opening/closing mechanism, as shown in FIGS. 1A and 1B. By the mold matching, the gates 120 and the cavities 130, 132 and 134 are formed. Step 11 described above corresponds to the "step for preparing a metal mold" set forth in the claims.

In step S12, while a mold fastening force is applied to the metal mold 110 by the mold opening/closing mechanism, a molten resin is injected from the injector 140 into the metal mold 110. The injected resin is injected into the internal space of the gates 120 and, first, flows into the space 133 of the second cavity 132 through the space 131 of the first cavity 130. As the route distance $D_4$ between each part of the outermost circumferential wall 132b and its nearest gate 120 is not constant, there arises a difference in the time taken for the resin injected into the gates 120 to reach each part of the outermost circumferential wall 132b. However, the resin that has reached parts whose route distance $D_4$ is shorter than that of a part α at which the route distance $D_4$ is longest (refer to FIG. 8) is made to flow in the space 133 toward the farthest part α because of the low flow resistance, more easily than a resin flowing toward the space 135 whose sectional area is reduced by the outermost circumferential wall 132b while withstanding the high flow resistance. Due to this, the amount of resin that crosses the connection boundary $B_1$ and flows from the space 133 into the space 135 increases rapidly when the resin reaches the farthest part α. In this way, the resin that has crossed the connection boundary $B_1$ all at once reaches each part in the circumferential direction of the outermost circumferential wall 134b almost simultaneously because the route distance $D_2$ between the outermost circumferential wall 132b and the welding target molding part 134a and the route distance $D_1$ between the outermost circumferential wall 134b and the welding target molding part 134a are almost constant, and moreover, the filling of the resin is completed almost simultaneously at each part in the circumferential direction of the welding target molding part 134a. After the entire third cavity 134 is filled with the resin, the second cavity 132 and the first cavity 130 are filled with the resin in this order. The resin filled in each of the cavities 130, 132 and 134 is cooled and solidified to mold the parts 32, 36 and 37 of the cap 30 as shown in FIG. 6. Step S12 described above corresponds to the "step for molding a laser beam transmitting member using a metal mold" set forth in the claims.

As described above, each part of the welding target molding part 134a, at which the filling of a resin is completed almost simultaneously, can mold the welding target part 37a uniform not only in the inclusion rate of crystal but also in the transmittance of a laser beam, regardless of the route distance $D_3$ between each part and its nearest gate 120. Therefore, even if the irradiation energy is determined in accordance with any specific part of the welding target part 37a for laser welding in step S3 described above, there is no difference in the energy given to the step wall 24 by the laser beams that have been transmitted through each part of the welding target part 37a. Because of this, neither a void nor a burr is produced and the welding strength and the good appearance can be maintained.

Second Embodiment

Figure 10A:
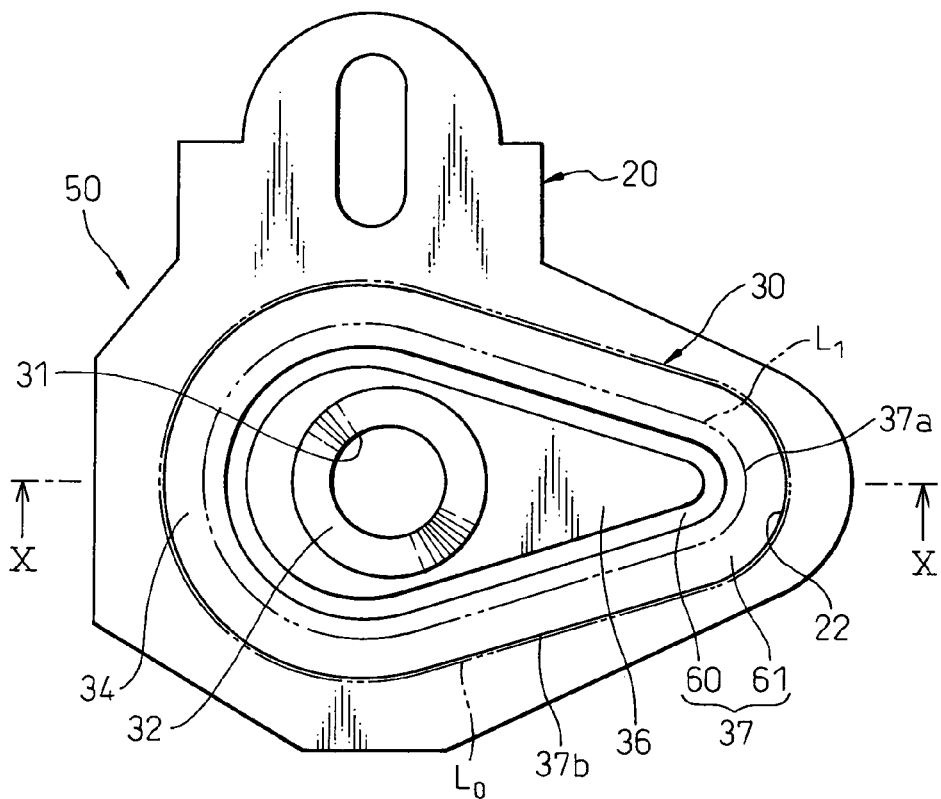
FIG. 10A is a sectional view showing an electromagnetic valve according to a second embodiment of the present invention.
Figure 10B:
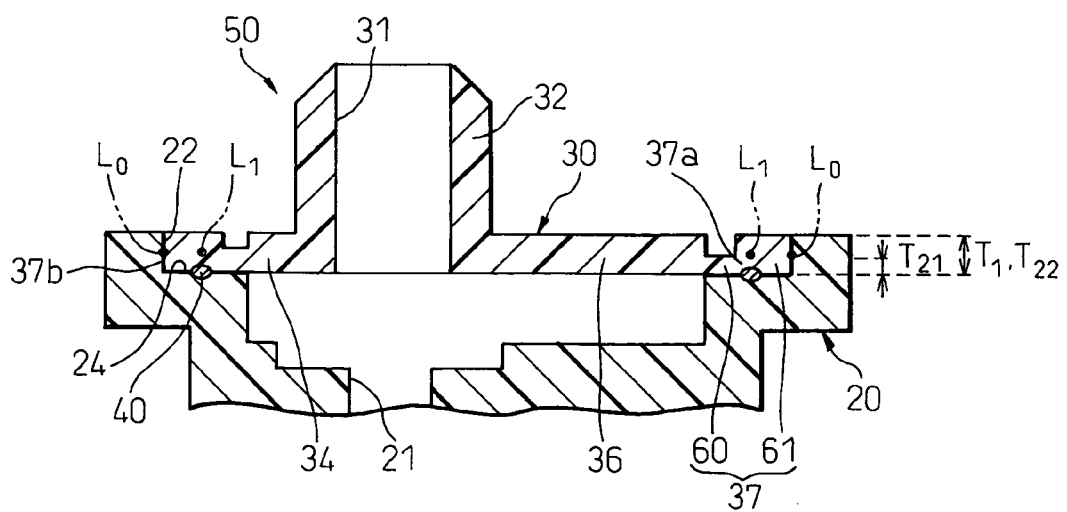
FIG. 10B is a sectional view along the X-X line in FIG. 10A.

An electromagnetic valve manufactured as a composite resin product according to a second embodiment is shown in FIG. 10.

In an electromagnetic valve 50 according to the second embodiment, the insertion plate part 34 of the cap 30 comprises the inner circumferential part 36 having a constant thickness $T_1$ and the outer circumferential part 37 whose plate thickness changes stepwise in the radial direction. The outer circumferential part 37 has a thin part 60 having a constant thickness $T_{21}$, which is thinner than the inner circumferential part 36, and a thick part 61 having a constant thickness $T_{22}$, which is thicker than the thin part 60, in this order outwardly in the radial direction. In the present embodiment, the thickness $T_1$ of the inner circumferential part 36 is equal to the thickness $T_{22}$ of the thick part 61. The thick part 61 of the outer circumferential part 37 of the insertion plate part 34 is inserted into the insertion hole part 22 and the part 37a of the thick part 61 along the virtual curve $L_1$ is welded to the step wall 24.

Figure 11A:
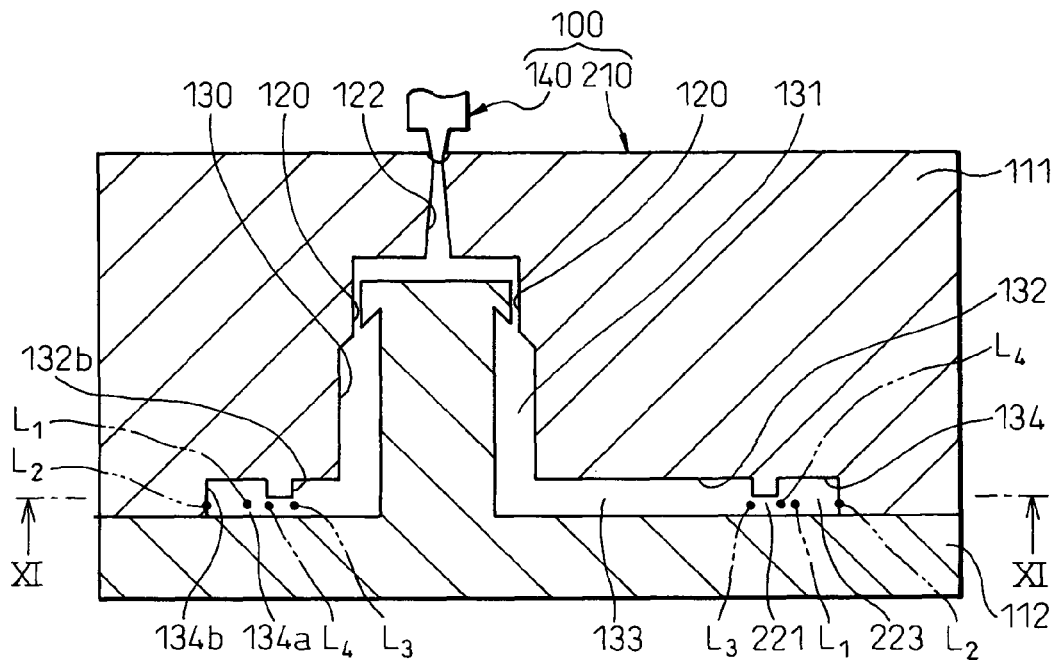
FIG. 11A is a sectional view showing a resin molding apparatus used in the manufacturing of the electromagnetic valve according to the second embodiment.
Figure 11B:
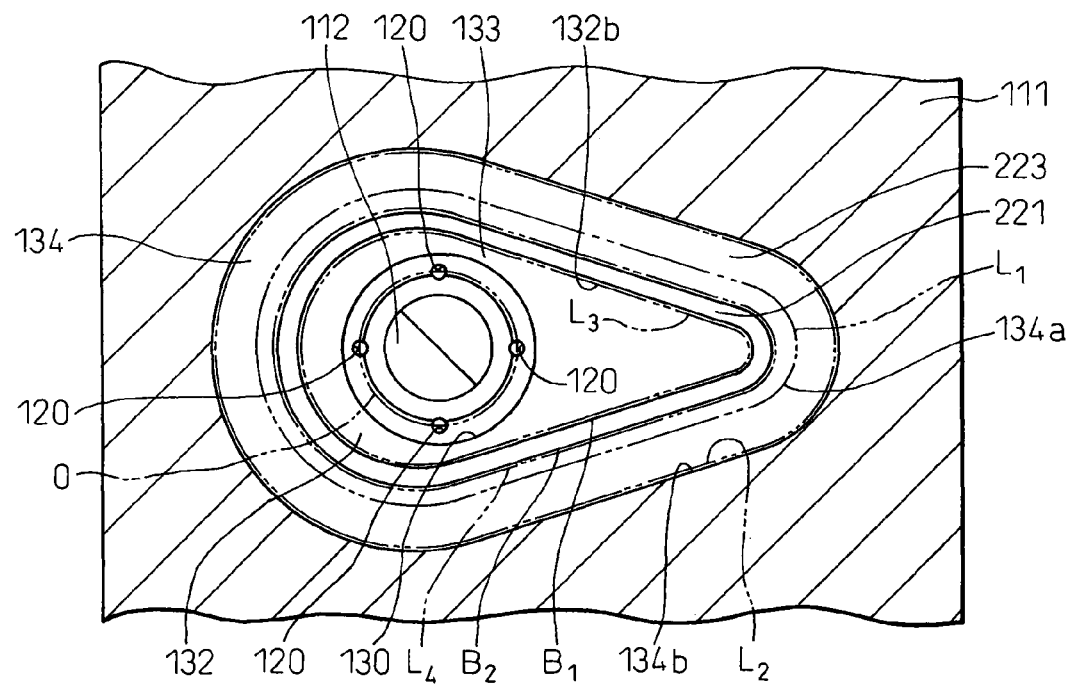
FIG. 11B is a sectional view along the XI-XI line in FIG. 11A.

The method for manufacturing the electromagnetic valve 50 according to the second embodiment differs from the method for manufacturing the electromagnetic valve 10 according to the first embodiment in that the cap 30 is manufactured using the resin molding apparatus 100 comprising a metal mold 210 shown in FIGS. 11A and 11B.

The metal mold 210 is explained below on the assumption that the mold matching of the metal mold 210 has been done.

The metal mold 210 differs from the metal mold 110 according to the first embodiment in the configuration of the third cavity 134. To be specific, the third cavity 134 forms a space 221, whose section is annular, by the wall surface that has the outline shape of the thin part 60 of the outer circumferential part 37. The third cavity 134 further forms a space 223 whose section is annular at the outer circumferential side of the space 221, that is, at the opposite side of the second cavity, by the wall surface that has the outline shape of the thick part 61 of the outer circumferential part 37. When the space 223 is not filled with a resin, the resin that has flowed into the space 221 from the second cavity 132 flows toward the space 223 to fill the space 223 through the third cavity 134. After the space 223 is filled with the resin, the resin that has flowed from the second cavity 132 is filled into the space 221 through the third cavity 134. The third cavity 134 molds the thick part 61 and the thin part 60 respectively out of the resin filled in the spaces 223 and 221 sequentially. In other words, the third cavity 134 molds the outer circumferential part 37 including the welding target part 37a.

Figure 12:
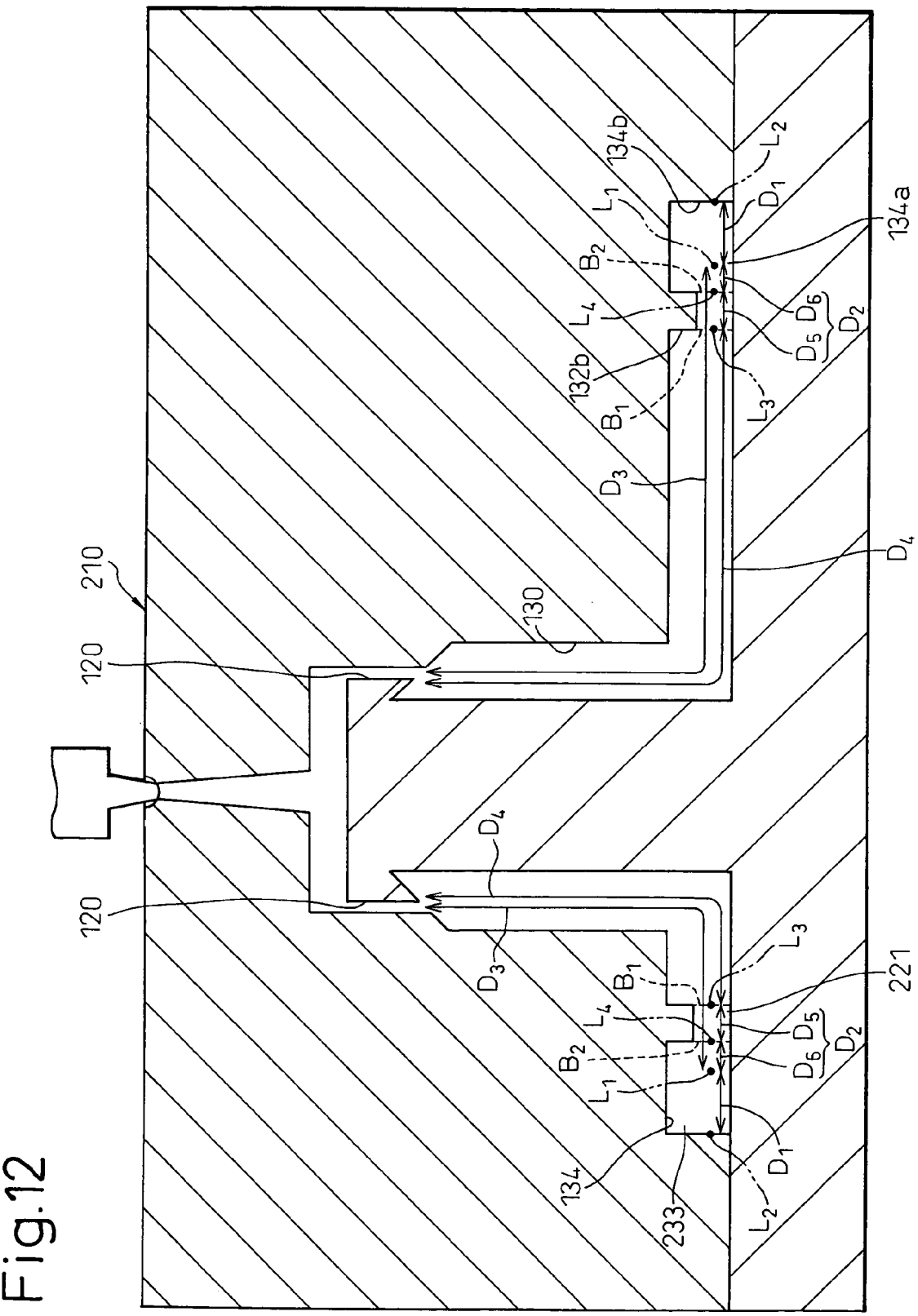
FIG. 12 is an enlarged view showing the resin molding apparatus used in the manufacturing of the electromagnetic valve according to the second embodiment, and is a sectional view corresponding to FIG. 11A.

As shown in FIGS. 11A, 11B and 12, the virtual curve $L_1$ is formed in the welding target molding part 134a of the third cavity 134 in the metal mold 210. In this state, a boundary $B_2$ between the space 221 and the space 223 is located at the upstream side of the virtual curve $L_1$ in the direction of the resin flow in the third cavity 134 is located at the downstream side of the parallel curve $L_3$ therein and, runs along a curve $L_4$ parallel to the virtual curve $L_1$. Therefore, as shown in FIG. 12, a route distance $D_5$ between the connection boundary $B_1$ and the boundary $B_2$ and a route distance $D_6$ between the boundary $B_2$ and the welding target molding part 134a are each almost constant, and the route distance $D_2$, which is the sum of $D_5$ and $D_6$, is also almost constant. In a state in which the above-mentioned virtual curve $L_1$ is formed, the outermost circumferential wall 134b facing the space 223 of the third cavity 134 runs along the parallel curve $L_2$ located at the downstream side of the virtual curve $L_1$ as in the first embodiment, and is spaced with an almost constant distance $D_1$ from the welding target molding part 134a. The route distance $D_3$ between each part of the welding target molding part 134a and its nearest gate 120 changes in the circumferential direction of the part 134a as shown, for example, in FIG. 12 and the route distance $D_4$ between each part of the outermost circumferential wall 132b and its nearest gate 120 changes in the circumferential direction of the wall 132b as shown, for example, in FIG. 12. Also in the present embodiment, as described above, the third cavity 134 corresponds to the "cavity" set forth in the claims and the outermost circumferential wall 134b corresponds to the "filling terminal wall" set forth in the claims.

The method for molding the cap 30 out of a resin using the resin molding apparatus 100 comprising the above-mentioned metal mold 210 is explained below. First, in a step corresponding to the step S11 in the first embodiment, after the mold matching of the mold templates 111 and 112 of the metal mold 210 is done as shown in FIGS. 11A and 11B, a molten resin is injected into the metal mold 210 in a step corresponding to the step S12 in the first embodiment. Due to this, according to the same principle as that in the first embodiment, the resin that has crossed the connection boundary $B_1$ toward the third cavity all at once crosses the boundary $B_2$ and flows into the space 223 from the space 221. When the sectional areas of the spaces 221 and 223, whose cross sections are annular, perpendicular to an axis extending in the radial direction are compared, the sectional area of the space 223 is larger than that of the space 221 in accordance with the difference in thickness between the thin part 60 and the thick part 61 ($T_{22}$-$T_{21}$). Therefore, when the resin crosses the boundary $B_2$, the sectional area of the resin flow is enlarged. However, as the route distance $D_5$ between the connection boundary $B_1$ and the boundary $B_2$ and the route distance $D_6$ between the welding target molding part 134a and the boundary $B_2$ are almost constant, the enlargement of the sectional area of the resin flow in the vicinity of the boundary $B_2$ makes almost no difference in the time taken for completely filling the resin into each part of the welding target molding part 134a. Therefore, neither a void nor a burr is produced and the welding strength and a good appearance can be maintained even if the irradiation energy of laser beam is determined in accordance with any specific part of the welding target part 37a molded by the welding target molding part 134a.

Third Embodiment

Figure 13A:
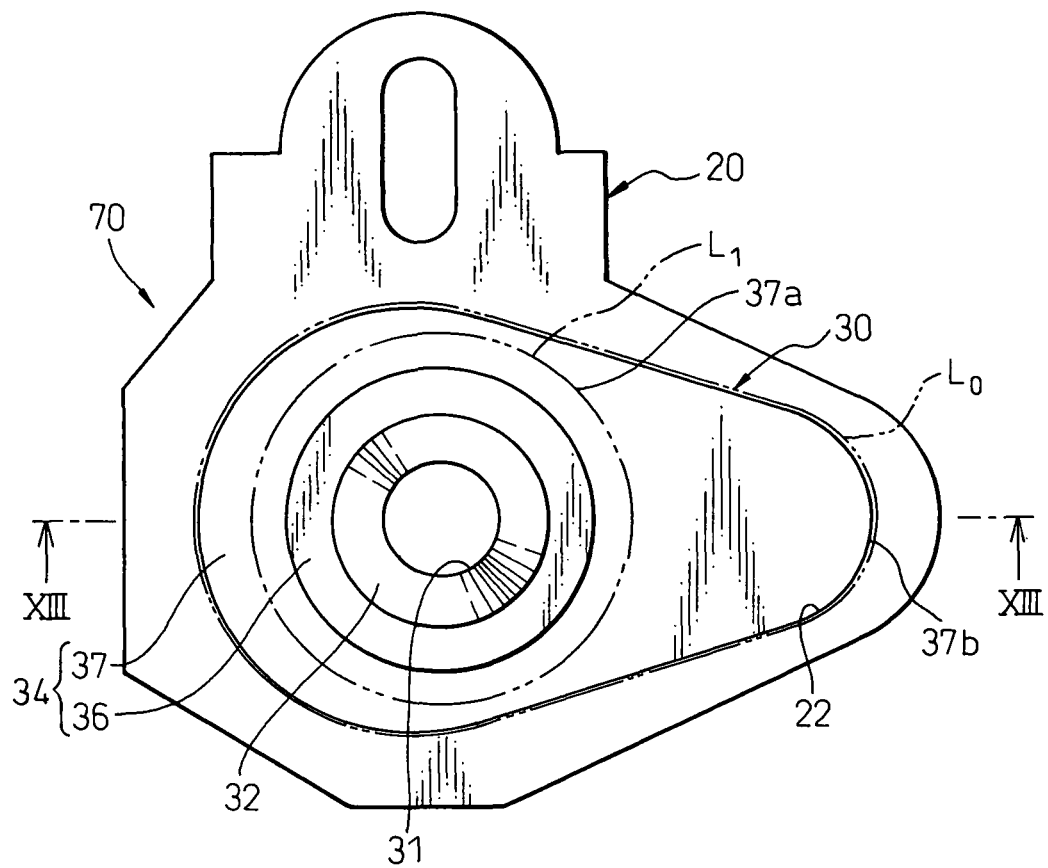
FIG. 13A is a sectional view showing an electromagnetic valve according to a third embodiment of the present invention.
Figure 13B:
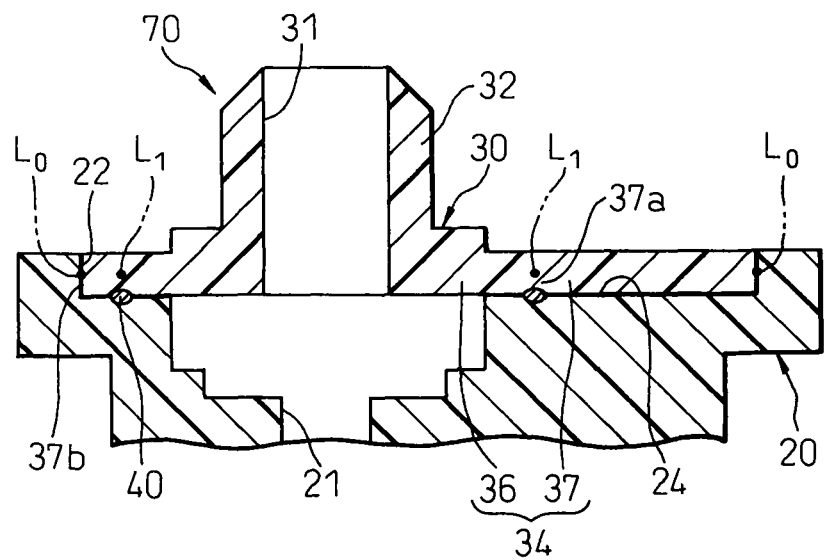
FIG. 13B is a sectional view along the XIII-XIII line in FIG. 13A.

An electromagnetic valve manufactured as a composite resin product according to a third embodiment of the present invention is shown in FIGS. 13A and 13B.

In the cap 30 of an electromagnetic valve 70 according to the third embodiment, the virtual curve $L_1$, along which the part 37a to be welded to the step wall 24 runs, is an annular curve or, to be exact, a complete circle. Therefore, the outline curve $L_0$ of the outermost circumferential wall 37b whose curvature changes in the circumferential direction does not coincide with any curve parallel to the virtual curve $L_1$.

Figure 14A:
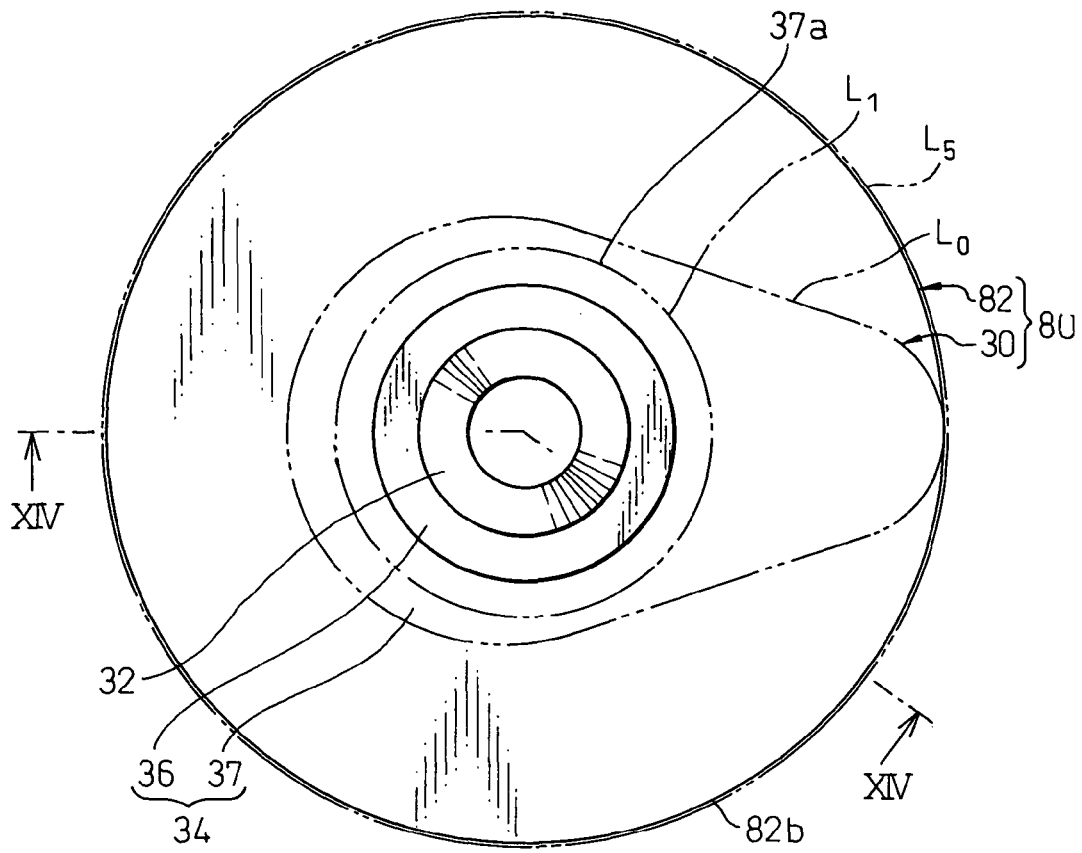
FIG. 14A is a plan view showing a blank molded in the manufacturing of the electromagnetic valve according to the third embodiment.
Figure 14B:
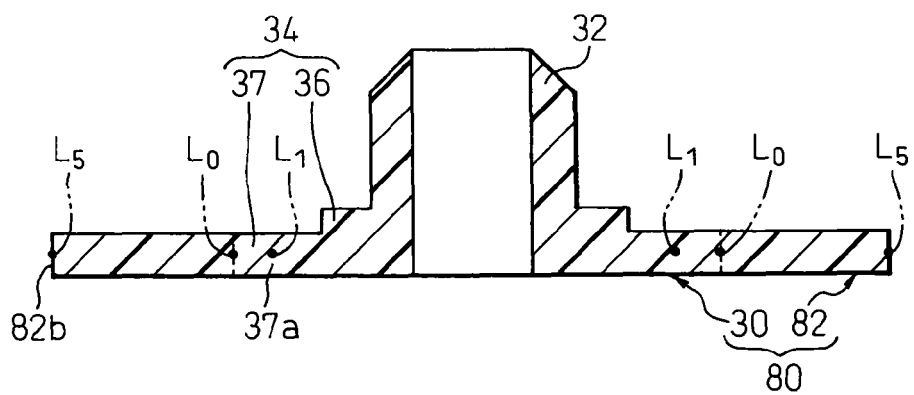
FIG. 14B is a sectional view along the XIV-XIV line in FIG. 14A.
Figure 15A:
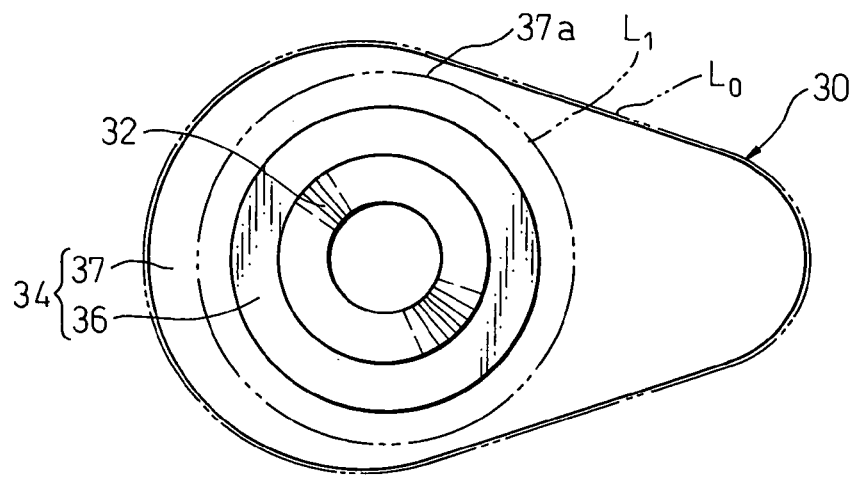
FIG. 15A is a plan view showing a cap separated from an excess material part in the manufacturing of the electromagnetic valve according to the third embodiment.
Figure 15B:
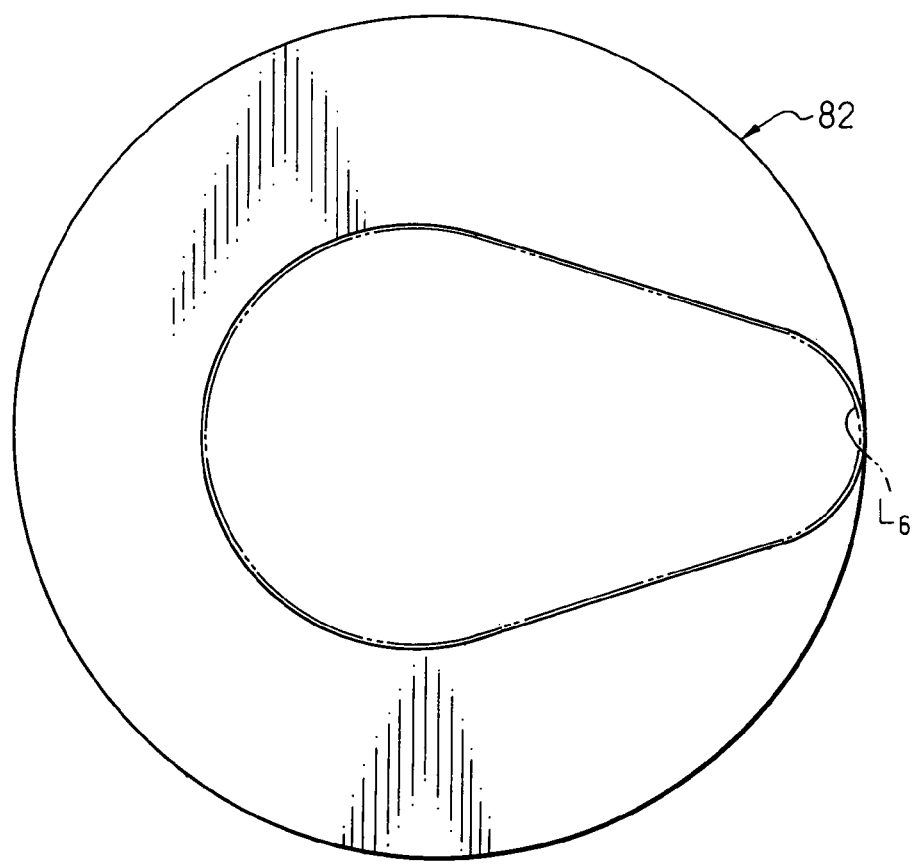
FIG. 15B is a plan view showing a cap and an excess material part separated from each other in the manufacturing of the electromagnetic valve according to the third embodiment.

The method for manufacturing the electromagnetic valve 70 according to the third embodiment differs from that according to the first embodiment in the manufacturing method of the cap 30. In other words, as shown in FIGS. 14A and 14B, after a blank 80 is molded out of a resin, the cap 30 is obtained by removing an excess material part 82 of the blank 80 as shown in FIGS. 15A and 15B, in the third embodiment. The blank 80 has a shape in which the excess material part 82 is attached to the outer circumferential side of the insertion plate part 34 of the cap 30. Due to this, an outline curve $L_5$ of an outermost circumferential wall 82b of the excess material part 82 is made to coincide with a curve parallel to the virtual curve $L_1$, along which the welding target part 37a runs.

Figure 16A:
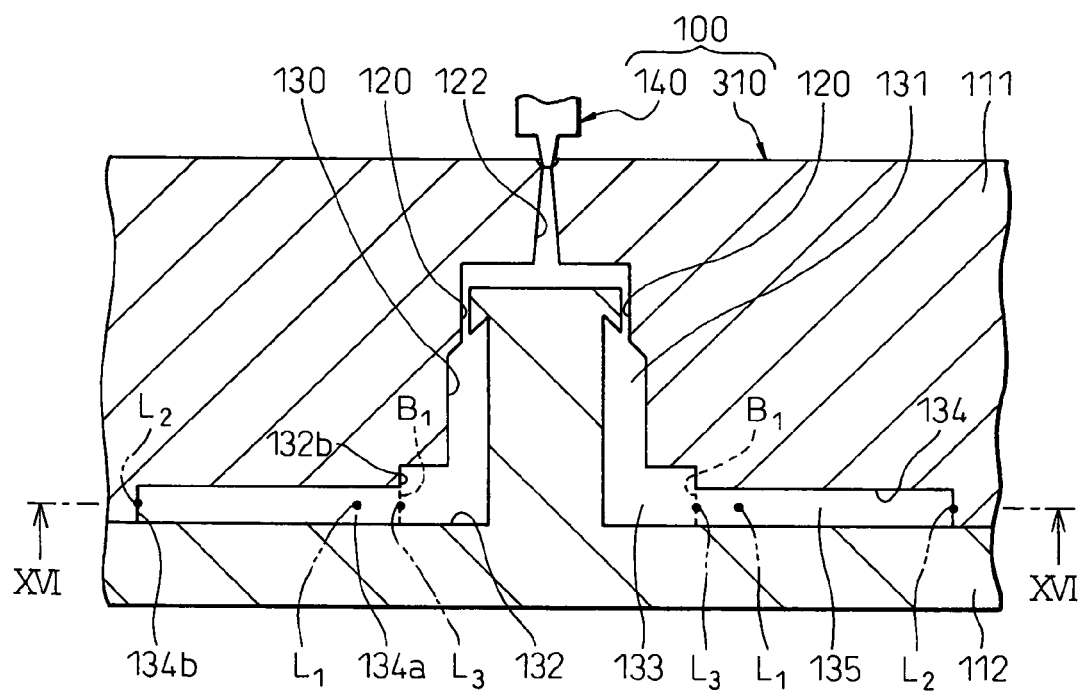
FIG. 16A is a sectional view showing a resin molding apparatus used in the manufacturing of the electromagnetic valve according to the third embodiment.
Figure 16B:
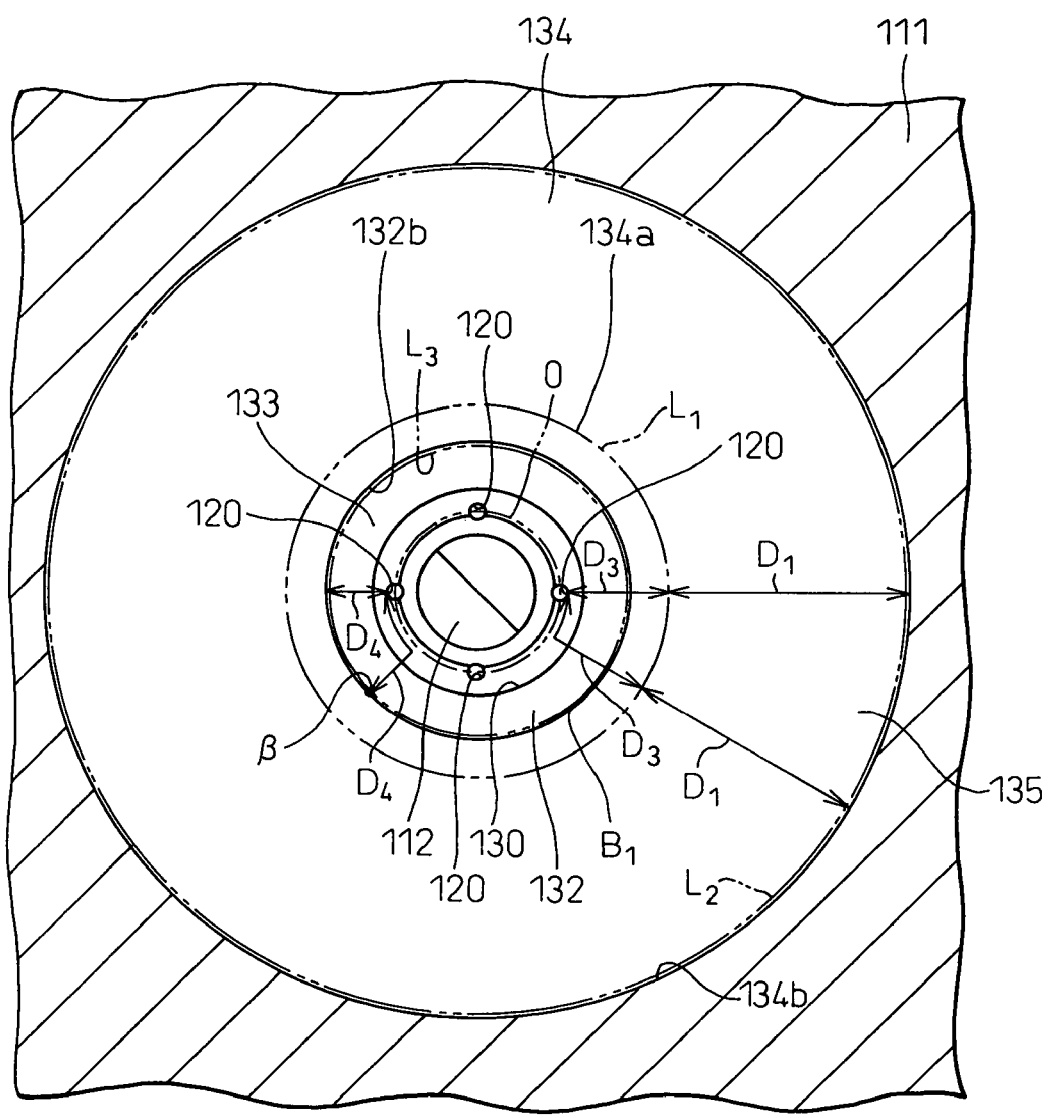
FIG. 16B is a sectional view along the XVI-XVI line in FIG. 16A.
Figure 17:
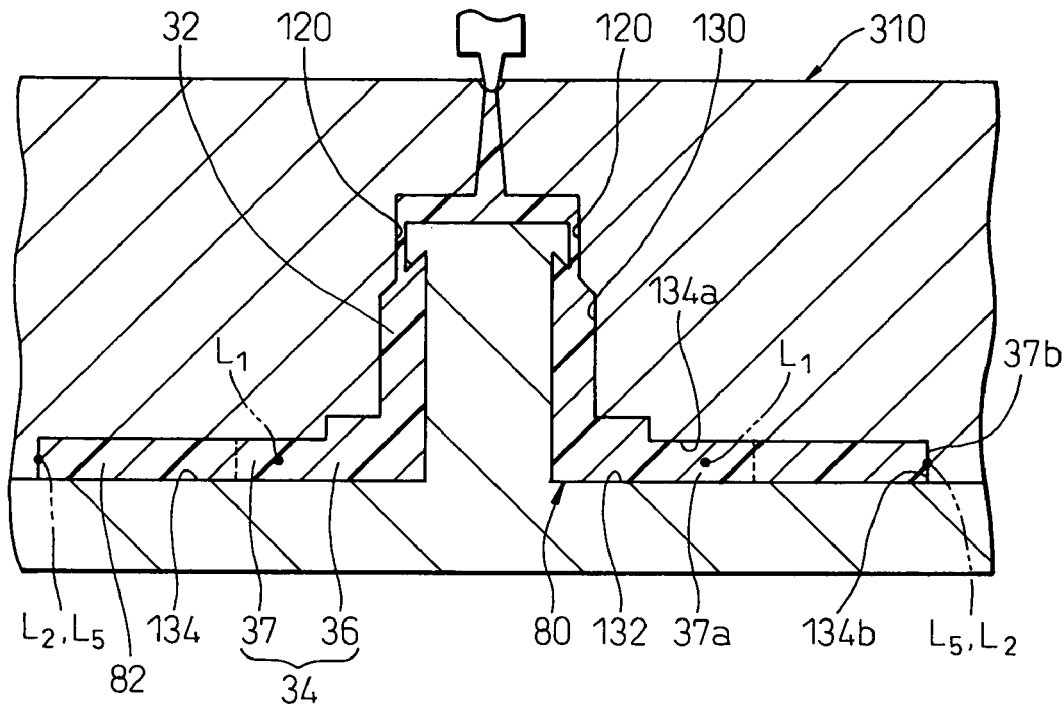
FIG. 17 is a diagram showing a method for molding the blank out of a resin in the manufacturing of the electromagnetic valve according to the third embodiment, and is a sectional view corresponding to FIG. 16A.

The resin molding apparatus 100 comprising a metal mold 310 shown in FIGS. 16A, 16B and 17 is used for molding the blank 80 out of a resin. The metal mold 310 is explained below on the assumption that the mold matching of the metal mold 310 has been done.

The metal mold 310 differs from the metal mold 110 in the first embodiment in the configuration of the third cavity 134. To be specific, the metal mold 310 is configured so that the third cavity 134 molds the outer circumferential part 37 and the excess material part 82 or, more particularly, so that the outermost circumferential wall 134b of the third cavity 134 molds the outermost circumferential wall 82b of the excess material part 82. Therefore, when the virtual curve $L_1$ is formed in the welding target molding part 134a of the third cavity 134, the outline curve $L_5$ of the outermost circumferential wall 82b to be molded by the outermost circumferential wall 134b coincides with the curve $L_2$ parallel to the virtual curve $L_1$, as shown in FIG. 17. In a state in which the virtual curve $L_1$ is formed, the outermost circumferential wall 134b runs along the parallel curve $L_2$ located at the downstream side of the virtual curve $L_1$ and is spaced with an almost constant distance $D_1$ from the welding target molding part 134a as in the first embodiment. The route distance $D_3$ between each part of the welding target molding part 134a and its nearest gate 120 changes in the circumferential direction of the part 134a as shown, for example, in FIGS. 16A and 16B and the route distance $D_4$ between each part of the outermost circumferential wall 132b and its nearest gate 120 changes in the circumferential direction of the wall 132b as shown, for example, in FIG. 17. As described above, also in the present embodiment, the third cavity 134 corresponds to the "cavity" set forth in the claims and the outermost circumferential wall 134b corresponds to the "filling terminal wall" set forth in the claims.

Figure 18:
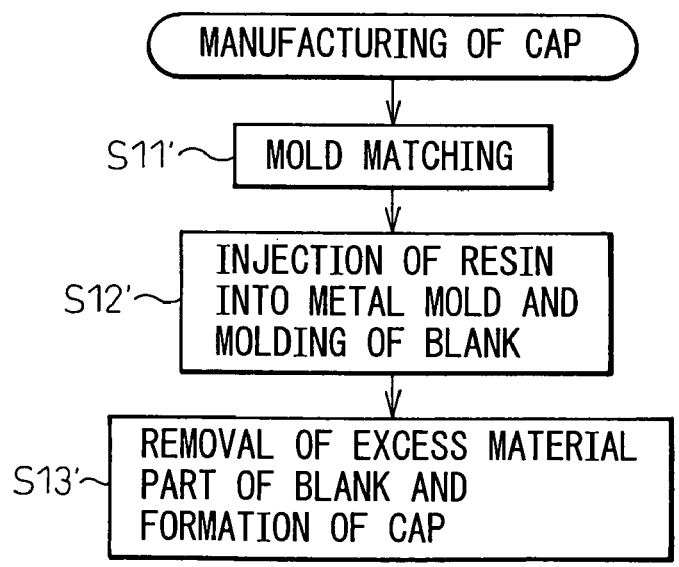
FIG. 18 is a flow chart for explaining a method for manufacturing the cap in the manufacturing of the electromagnetic valve according to the third embodiment.
Figure 19A:
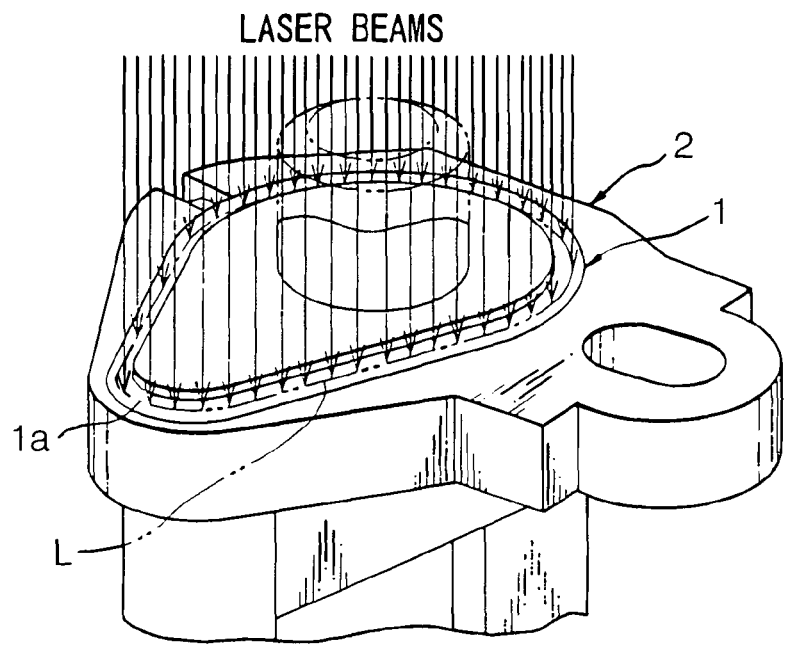
FIG. 19A is a perspective view showing a method for manufacturing a conventional composite resin product by using a laser welding method.
Figure 19B:
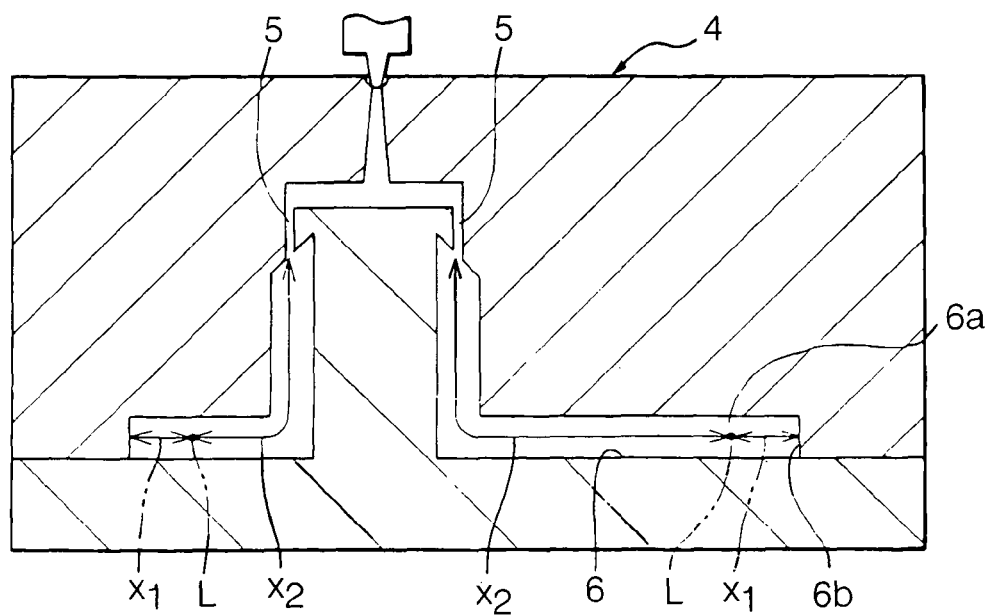
FIG. 19B is a sectional view showing a metal mold used for molding a resin into a laser beam transmitting member shown in FIG. 19A.
Figure 20A:
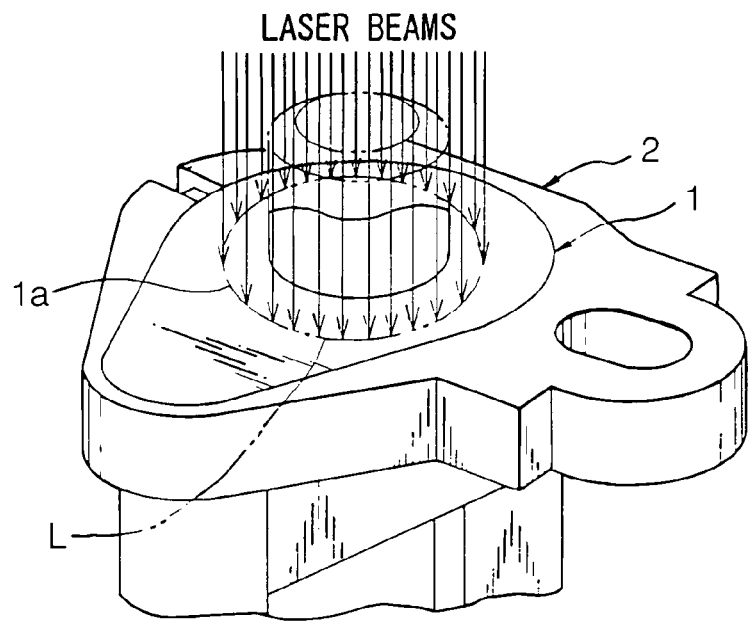
FIG. 20A is a perspective view showing another method for manufacturing the conventional composite resin product by using a laser welding method.
Figure 20B:
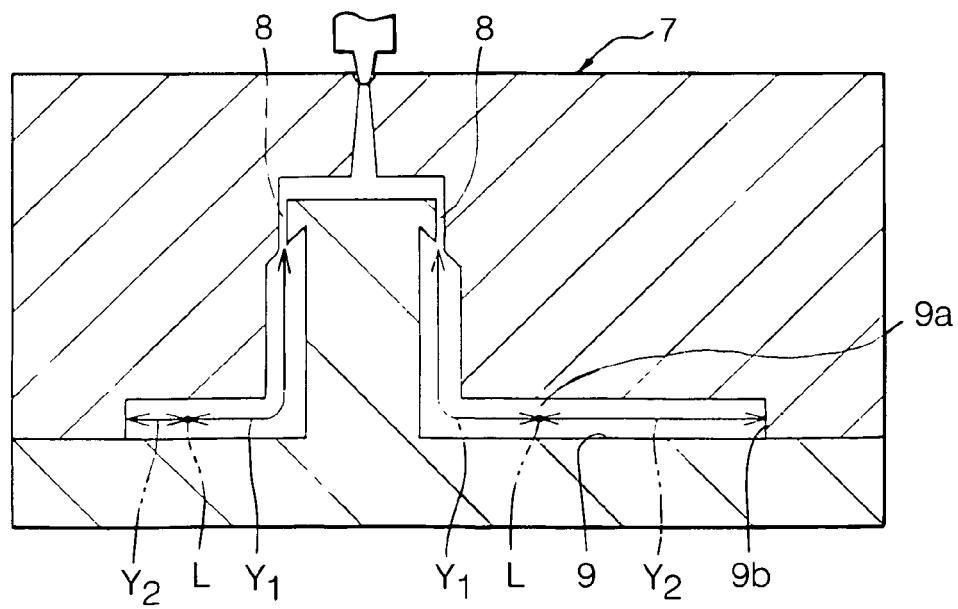
FIG. 20B is a sectional view showing a metal mold used for molding a resin into a laser beam transmitting member shown in FIG. 20A.

The method for molding the blank 80 out of a resin using the resin molding apparatus 100 comprising the metal mold 310 described above and then forming the cap 30 is explained in detail according to the flow chart shown in FIG. 18.

In step S11', the mold matching of the mold templates 111 and 112 of the metal mold 310 is done as shown in FIGS. 16A and 16B in the same manner as that in step S11 in the first embodiment. Step S11' described above corresponds to the "step for preparing a metal mold" set forth in the claims.

In step S12', a molten resin is injected into the metal mold 310 in the same manner as that in step S12 in the first embodiment. As a result, in each area of the outermost circumferential wall 132b to which the same gate 120 is nearest, the resin that has reached a part whose route distance $D_4$ is shorter than that of a part β at which the route distance $D_4$ is longest (refer to FIG. 16B) is made to more easily flow toward the farthest part β according to the same principle as that in the first embodiment. Therefore, the resin that has crossed the connection boundary $B_1$ toward the third cavity 134 all at once reaches each part of the outermost circumferential wall 134b that molds the outermost circumferential wall 82b of the excess material part 82 almost simultaneously and the filling of the resin at each part of the welding target molding part 134a is completed almost simultaneously. After the entire third cavity 134 is filled with the resin, the second and first cavities 132 and 130 are filled with the resin sequentially and the resin filled in each of the cavities 130, 132 and 134 is cooled and solidified. In this manner, the blank 80 having the excess material part 82 attached to the outer circumferential part 37 of the cap 30 is molded as shown in FIG. 17.

In step S12', the blank 80 having the ability to transmit laser beams and a crystalline structure is molded out of the thermoplastic resin described in the first embodiment. Step S12' described above corresponds to the "step for molding a blank using a metal mold" set forth in the claims.

In step S13', the cap 30 having the ability to transmit laser beams and having a crystalline structure is formed by removing the excess material part 82 attached to the blank 80 by cutting work, shearing work, etc. At this time, as shown in FIGS. 15A and 15B, a cutting curve $L_6$ is formed in the blank 80 so that the curve coincides with the outline curve $L_0$ of the cap 30 to be formed and the cap 30 is separated from the excess material part 82 by cutting the blank 80 along the cutting curve $L_6$. In step S13', after the excess material part 82 is removed, it may be possible to provide finishing work, such as polishing work, to the outermost circumferential wall 37b along the outline curve $L_0$ of the cap 30. Step S13' described above corresponds to the "step for molding a laser beam transmitting member" set forth in the claims.

According to the third embodiment, as described above, even when the outline curve $L_0$ of the cap 30 does not coincide with any curve parallel to the virtual curve $L_1$, it is possible to mold the welding target part 37a out of the resin filled almost simultaneously in each part of the welding target molding part 134a. As the inclusion rate of crystal and transmittance of laser beam at the welding target part 37a are uniform in the circumferential direction, neither a void nor a burr is produced even if the irradiation energy is determined in accordance with any specific part of the welding target part 37a during laser welding and the welding strength and good appearance can be maintained.

The plurality of embodiments of the present invention are described as above.

Although the virtual curve $L_1$ along which the welding target part 37a of the cap 30 runs is an annular curve, that is, a closed curve in the plurality of embodiments described above, the virtual curve $L_1$ may be a straight line or an open curve such as a wavy line. Similarly, in accordance with the virtual curve $L_1$, a closed curve or open curve may be adequately adopted as the parallel curves $L_2$, $L_3$ and $L_4$ formed in the metal molds 110, 210 and 310, respectively.

In the plurality of embodiments described above, the plurality of gates 120 are formed in the metal molds 110, 210 and 310 to be used for molding the cap 30 or the blank 80 out of a resin. In contrast to this, even if only the one gate 120 to be connected to the first cavity 130 is formed in the metal molds 110, 210 and 310, the same effects as those in the plurality of embodiments described above can be obtained.

Further, in the plurality of embodiments described above, the entire circumferential area of the welding target part 37a along the virtual curve $L_1$ is irradiated with laser beams almost simultaneously, in the cap 30. In contrast to this, the entire circumferential area of the welding target part 37a may be irradiated with laser beams by sequentially moving the part to be irradiated with a laser beam along the virtual curve $L_1$ in the welding target part 37a.

Furthermore, in the plurality of embodiments described above, after the cap 30 is manufactured, the housing 20 is manufactured. In contrast to this, the cap may be manufactured after the housing 20 is manufactured or the cap 30 and the housing 20 may be manufactured simultaneously.

Still furthermore, in the plurality of embodiments described above, the present invention is applied to the manufacturing of the electromagnetic valves 10, 50 and 70 in which the cap 30 is welded to the housing 20, but the present invention may also be applied to the manufacturing of various composite resin products in which a laser beam transmitting member is welded, with a laser beam, to a laser beam absorbing member.

While the invention has been described by reference to specific embodiments chosen for the purposes of illustration, it should be apparent that numerous modifications could be made thereto, by those skilled in the art, without departing from the basic concept and scope of the invention.

What is claimed is:

1. A method for manufacturing a laser beam transmitting member which is formed as part of a composite resin product by welding with a laser beam a welding target part along a virtual curve to a laser beam absorbing member, said method comprising:

preparing a metal mold having at least a gate, a cavity in which a virtual curve is formed, which forms at least a welding target part along the virtual curve, and in which a filling terminal wall is formed along a first parallel curve which runs substantially parallel with the virtual curve at a substantially constant distance, and a throttle part for reducing the flow of a resin flowing from at least the gate toward the cavity, which is connected to the cavity, and whose connection boundary is formed along a second parallel curve which runs substantially parallel with the virtual curve at a substantially constant distance; and molding the crystalline laser beam transmitting member, which is formed out of an injected resin after injecting a resin into the gate, by using the metal mold, wherein the cavity comprises an intermediate cavity connected to the gate, and a terminal cavity connected to the intermediate cavity and located downstream from the intermediate cavity;

the throttle part is located between the intermediate cavity and the terminal cavity, and has a height lower than that of the intermediate cavity;

the terminal cavity is closed by the filling terminal wall; and distances from the gate to the throttle part are different at points along the throttle part and distances from the throttle part to the filling terminal wall are substantially the same at any point along the throttle part;

the throttle part is located at a connection boundary of the intermediate cavity and the terminal cavity and at an outer circumferential wall of the intermediate cavity;

the laser welding target part is located between the throttle part and the filling terminal wall; and the terminal cavity from the throttle part to the filling terminal wall has a thickness in a direction of the laser irradiation which is uniform though a whole circumference of the terminal cavity.

2. A method for manufacturing a laser beam transmitting member as in claim 1, and further comprising:

manufacturing a laser beam absorbing member; and welding, with a laser beam, the welding target part of the laser beam transmitting member to the laser beam absorbing member.

* * * * *